US007854073B1

(12) United States Patent
Webb

(10) Patent No.: US 7,854,073 B1
(45) Date of Patent: Dec. 21, 2010

(54) QUILT TEMPLATE

(75) Inventor: James L. Webb, Tampa, FL (US)

(73) Assignee: Precision Quilting Templates, Inc., Tampa, FL (US)

(*) Notice: Subject to any disclaimer, the term of this patent is extended or adjusted under 35 U.S.C. 154(b) by 0 days.

(21) Appl. No.: 12/653,070

(22) Filed: Dec. 8, 2009

Related U.S. Application Data

(60) Provisional application No. 61/201,249, filed on Dec. 9, 2008.

(51) Int. Cl.
*G01B 3/14* (2006.01)
*A41H 3/00* (2006.01)

(52) U.S. Cl. .............................. 33/566; 33/563; 33/1 G

(58) Field of Classification Search ................... 33/566, 33/565, 562, 563, 1 B, 1 G
See application file for complete search history.

(56) References Cited

U.S. PATENT DOCUMENTS

| | | | | |
|---|---|---|---|---|
| 4,608,939 | A * | 9/1986 | Lampley | 33/562 |
| 4,945,642 | A * | 8/1990 | Saulietis | 33/17 R |
| D359,615 | S * | 6/1995 | Broy | D3/18 |
| 5,557,996 | A * | 9/1996 | Reber et al. | 33/563 |
| 5,579,670 | A * | 12/1996 | McCormick | 33/562 |
| 5,638,605 | A * | 6/1997 | Sligar | 33/494 |
| 5,749,149 | A | 5/1998 | Claytor | |
| 5,791,062 | A | 8/1998 | Walker | |
| 5,842,280 | A | 12/1998 | Robell | |
| 6,049,987 | A | 4/2000 | Robell | |
| 6,115,926 | A | 9/2000 | Robell | |
| 6,155,189 | A * | 12/2000 | Walner | 33/13 |
| 6,216,354 | B1 | 4/2001 | Carbone | |
| 6,276,070 | B1 * | 8/2001 | Hawley | 33/563 |
| 6,321,458 | B1 | 11/2001 | Hess | |
| 6,829,833 | B2 | 12/2004 | Langman | |
| 6,918,189 | B1 | 7/2005 | McBrayer | |
| 6,925,724 | B2 | 8/2005 | Tandy | |
| 6,935,039 | B1 * | 8/2005 | Hess | 33/562 |
| D549,115 | S * | 8/2007 | Tucker | D10/64 |
| 7,281,337 | B1 | 10/2007 | Oehlke et al. | |
| 7,287,339 | B2 | 10/2007 | Robertson | |
| 7,350,473 | B2 | 4/2008 | Henry | |
| 7,383,640 | B2 | 6/2008 | Barry | |
| 7,448,142 | B2 * | 11/2008 | Geier | 33/566 |
| 7,568,295 | B1 * | 8/2009 | Strain | 33/566 |
| 7,730,842 | B1 * | 6/2010 | Sebrow | 33/566 |
| 7,770,303 | B2 * | 8/2010 | Graham et al. | 33/562 |
| 2004/0049935 | A1 * | 3/2004 | Tandy | 33/563 |
| 2005/0132592 | A1 | 6/2005 | Robertson | |

(Continued)

*Primary Examiner*—Yaritza Guadalupe-McCall
(74) *Attorney, Agent, or Firm*—Frijouf, Rust & Pyle, P.A.

(57) ABSTRACT

A quilt template is disclosed for producing a plurality of quilt pieces. The quilt template comprises a template plate for positioning over a first and second layer material. A marking groove traverses the template plate and receives a writing instrument. A first cutting groove traverses the template plate and receives the cutting instrument for cutting the first and second layer of material. A second cutting groove traverses the template plate and receives the cutting instrument for cutting the first and second layer of material. The marking groove is positioned between the first cutting groove and the second cutting groove. The marking groove and the first cutting groove define a first quilt pattern on the template plate. The marking groove and the second cutting groove define a second quilt pattern on the template plate.

19 Claims, 24 Drawing Sheets

U.S. PATENT DOCUMENTS

| | | | | |
|---|---|---|---|---|
| 2005/0252019 | A1 | 11/2005 | Gordon et al. | |
| 2006/0032068 | A1 * | 2/2006 | Sherman et al. | 33/566 |
| 2006/0130723 | A1 | 6/2006 | Henry | |
| 2007/0011900 | A1 | 1/2007 | Mastroianni | |
| 2007/0193051 | A1 | 8/2007 | Winslow | |
| 2007/0220769 | A1 * | 9/2007 | Oehlke et al. | 33/563 |
| 2007/0251111 | A1 * | 11/2007 | Barry | 33/562 |
| 2008/0078094 | A1 | 4/2008 | Baumann | |
| 2009/0025245 | A1 * | 1/2009 | Brady | 33/562 |
| 2009/0113737 | A1 * | 5/2009 | Graham et al. | 33/562 |

* cited by examiner

QUILT TEMPLATE

CROSS-REFERENCE TO RELATED APPLICATIONS

This application claims benefit of U.S. Patent Provisional application Ser. No. 61/201,249 filed Dec. 9, 2008. All subject matter set forth in provisional application Ser. No. 61/201,249 is hereby incorporated by reference into the present application as if fully set forth herein.

BACKGROUND OF THE INVENTION

1. Field of the Invention

This invention relates to templates and more particularly to the quilt template for producing a plurality of quilt pieces.

2. Background of the Invention

Quilting and more particularly crafting patchwork quilts has been a relatively popular activity throughout history. Patchwork quilts are produced by assembling a plurality of material pieces to form blocks. The blocks may be arranged in an artful design and sewn together. The preparation of the many blocks required to complete a quilt is a laborious and time consuming task.

In one example, the blocks may comprise two dissimilar pieces of material each cut as an equal sided right triangle with their hypotenuses adjacent to each other and sewn together to form a square. This then requires an inordinate amount of care be given to construct each block. The following U.S. Patents are examples of the prior art to construct a block to be utilized in a quilt.

U.S. Pat. No. 5,749,149 to Claytor discloses a quilt graphing system that enables a quilter to custom design quilts and appliques. The quilt designing system includes at least one transparent quilt graphing grid and a template. The grid has a plurality of uniform squares with dimensional markings (dots and dashes) on all four sides of each square in the grid. The dimensional markings divide each side of the square into thirds and quarters. So marked. the quilt graphing grid enables the quilt maker to graph in straight lines, extending between the dimensional markings, artwork beneath the transparent grid or artwork graphed directly on the grid. The template is specially designed for use by the quilt maker in marking each square of fabric to correspond with the shape of a specific portion of the selected design. and for cutting the squares of fabric with seams four piecing together the fabric squares to form the selected design.

U.S. Patent to Walker discloses a transparent flat sheet template facilitating the joining and cutting of pieces of fabric used to make conventional quilting units prior to assembly of the units into in a quilt. The template comprises a first edge having a first straight edge portion and a concave edge portion, the concave edge portion being a portion of a cirde. The template has second and third straight edges disposed perpendicularly to each other, and a fourth edge disposed parallel to the second edge. The template also includes an arcuate guideline which is generally similar in size and shape to the concave edge portion, and a grid of first and second sets of straight edges marked on the template. The first set of guidelines are parallel to each other and to the first. straight edge portion of the template. The second set of guidelines are parallel to each other and to the second edge of the template. The straight guidelines ate used to align the template with edges of a square of fabric. The concave edge portion facilitates accurate centering of a fabric circle on the square of fabric. and the arcuate guideline facilitates accurate cutting of the sewn fabric circle and square of fabric to produce quitting units.

U.S. Pat. No. 5,842,280 to Robell discloses a means of gridded measurement for the cutting of construction materials which comprises the imprinting of visually precise commonly used measurement markings upon the surfaces of construction materials during the manufacturing process to save time and improve the accuracy of cutting the construction materials on a job site. Unit markings may be numbered for quick dimensional reference and fractional markings may also be used. The lines for commonly used markings may also be highlighted, darkened, doubled, tripled, dashed or dotted, and color enhanced for easy recognition. Applications may include, but are not limited to, use on wallboard, shower board, insulation, gypsum board, plywood, and any other material which must be cut to exact measurements on a construction job site. Angled cuts may be easily made by cutting along the opposite corners of a predetermined number of grids counted in both horizontal and vertical directions.

U.S. Pat. No. 6,049,987 to Robell discloses an improved system and method of gridded measurement for the cutting of construction materials which comprises the imprinting of visually precise commonly used measurement markings upon the surfaces of construction materials during the manufacturing process to save time and improve the accuracy of cutting the construction materials on a job site wherein the improvement lies in the use of a plurality of non-perimeter horizontal and vertical unit measurement markings; protractor markings; and inverted numerals, informational markings, nailing guides, product specification markings, and curved lines. Angled cuts may be easily made by cutting along the opposite corners of a predetermined number of grids counted in both horizontal and vertical directions, through use of the protractor markings, or a combination of both. In preferred embodiments unit markings are numbered for quick dimensional reference and visually precise fractional markings are also used. The lines for commonly used markings may be highlighted, darkened, doubled, tripled, dashed or dotted, colored, or otherwise enhanced for easy recognition. Applications may include, but are not limited to, use on structural and non-structural panels such as wallboard, shower board, oriented strand board (OSB), insulation, fire retardant panel products, gyp-sum board, plywood, and other substantially rectangular material which must be cut to exact measurements on a construction job site.

U.S. Pat. No. 6,115,926 to Robell discloses a system of gridded measurement for the cutting, measuring, fastening, and installing of construction materials which comprises the imprinting of visually precise commonly used measurement markings upon the surfaces of construction materials during the manufacturing process to save time and improve the accuracy of cutting the construction materials on a job site or in a manufacturing facility and nailing it in place. Different embodiments of the system have varying combinations of grids, inter-grids, perimeter horizontal and vertical unit measurement markings; non-perimeter horizontal and vertical unit measurement markings; highlighted markings; numerical markings; fractional markings; protractor markings; informational markings; nailing guides; product specification markings; and curved lines. Angled cuts may be easily made by cutting along the opposite corners of a predetermined number of grids counted in both horizontal and vertical directions, through use of the protractor markings, or a combination of both. Lines for commonly used markings may be highlighted for easy recognition in a variety of ways, such as but not limited to being darkened, doubled, tripled, dashed or dotted, or color enhanced. Although not limited to the following applications, the system of the present invention may be used on structural and non-structural panels such as wallboard, shower board, oriented strand board (OSB), rigid and flexible insulation that is available in an aggregation of fan-folded sheets, fire retardant panel products, gypsum board, plywood, plastic laminates, and other substantially rectangular material which must be cut and nailed to exact measurements on a construction job site or in a manufacturing facility.

U.S. Pat. No. 6,216,354 to Carbone discloses a device for forming straight and curved score lines in sheet material. The device has a scoring plate with a top surface with a number of spaced apart curved grooves formed on the top surface thereof. Each of the spaced apart scoring grooves has different radii of curvature. An optional overlay template portion has a number of spaced apart curved slots formed therein. The overlay template portion is adapted to overlay the scoring plate such that the spaced apart curved slots align with the grooves on the scoring plate when placed thereon. A scoring tool with a tip sized to fit into the grooves in the scoring plate and the slots in the optional template overlay portion is provided for scoring the sheet material.

U.S. Pat. No. 6,321,458 to Hess discloses a quilting template method and apparatus. An exemplary quilting template apparatus includes a panel having a plurality of pattern pieces of a similar shape and size. Each pattern piece includes a first and a second plurality of slots disposed through the panel. Each slot is a guide for a marking device to apply a mark on a surface of a fabric along the respective slot. The panel has a fabric contacting surface and an opposite facing non-fabric contacting surface. A pictorial representation of a quilt design and a color scheme for the quilt design can be printed on the non-fabric contacting surface of the panel.

U.S. Pat. No. 6,829,833 to Langman discloses a guide for steadying the path of a cutting tool and enabling force to be applied to compress a workpiece on opposing sides of the path of the tool.

U.S. Pat. No. 6,918,189 to McBrayer discloses a combination layout tool especially for use in larger building projects that can be used repeatedly to accurately produce different angles and cuts or layouts. The tool is provided with incremental angle slots in radial alignment with a notch in one side edge for producing incremental angles, one or more rafter tail/ridgecut patterns in the side edge, angled slots in alignment with the short side of the patterns, tread and riser slots and an associated tread and riser hole in spaced relation from one another for laying out treads and risers for building stairs, a pivot point receiving hole and a plurality of incrementally spaced marker receiving holes for drawing different diameter circles, and/or one or more stud layout slots in the side edge for making stud layouts for framed walls.

U.S. Pat. No. 6,925,724 to Tandy discloses a quilting ruler which is square or rectangular in shape and has first, second, third and fourth edges with a first set of equally spaced rulings running parallel to the first and third edges of the ruler and at right angles to a second set of equally spaced rulings running parallel to the second and fourth edges of the ruler. The first line of the first set of rulings is spaced from the first edge of the ruler by a different interval from the interval by which the last line of that set of rulings is spaced from the third edge of the ruler, and the distance of each line of the first set of rulings from the first edge and of each line of the second set of rulings from the second edge is marked so as to be visible when the first and second edges of the ruler are in use and the distance of each line of the first set of rulings from the third edge and of each line of the second set of rulings from the fourth edge is marked so as to be visible when the third and fourth edges of the ruler are in use.

U.S. Pat. No. 7,281,337 Oehlke et al. discloses a template that aids quilt member fabrication. More specifically, a template is provided for selective inter-connection to layered fabric members wherein the template indicates the location for sewing and cutting individual fabric pieces that make up the layered fabric thereby yielding a composite quilt member.

U.S. Pat. No. 7,287,339 to Robertson discloses a template for ruling index cards and is a guide for marking a number of parallel lines on an unruled writing surface, such as a 3"×5" index card. The template has a number of parallel slits spaced at predesignated distances from each other. Preferably, a template with horizontal slits is used in combination with a template having vertical slits to form a grid with horizontal and vertical rules for blocking letters, i.e., for creating blocks, which ensure uniform size and spacing of letters drawn on the index card. The template may be used to form a grid on a marking substrate, which is used as a guide for marking sweepstakes entries on the substrate. A transparency may be laid over the substrate, and cutouts formed corresponding to the entries to fort a template for sweepstakes entries from the transparency.

U.S. Pat. No. 7,350,473 to Henry discloses a simplification of the process of placing quilt ties in the quilt during the quilt making process. The quilt tie device contains a plurality of openings that identify locations in the quilt for quilt ties. A quilt maker places the quilt tie device over a top layer of the quilt. The quilt tie device is positioned such that the openings in the device are at locations on the quilt where the maker desires to place quilt ties. The quilt maker performs the quilt tie operation by tying a quilt tie in the quilt layer at each location in the quilt that indicated by an opening in the quilt tie device.

U.S. Pat. No. 7,383,640 to Barry discloses a quilting template system and a method for selecting a template to facilitate quilting a border-like area of a craft-work with length-sides and width-sides meeting at corners. The template system includes a set of templates each having an edge of repeated patterns of equal pattern-length but differing in pattern-length from template to template, and a correlator indicating which template(s) of the set are usable for the craft-work without fractional-pattern use on either the length-sides or the width-sides thereof. The method includes a sequence of steps for selecting a template by using the correlator to indicate which templates are usable for quilting the entire border-like area without fractional pattern use. The system preferably includes groups of templates, templates of each group each having patterns of equal pattern-length but differing in pattern-shapes from template to template within the group. Another aspect of the invention involves assemblages of templates on trays in uniplanar organized arrangement with adjacent templates having complementary edges. Yet another aspect involves a template for establishing a continuous stitch-line of repeated portions each with halves of inverted symmetry.

U.S. Patent Application 2005/0132592 to Robertson discloses a template for ruling index cards and is a guide for marking a number of parallel lines on an un-ruled writing surface, such as a 3"×5" index card. The template has a number of parallel slits spaced at pre-designated distances from each other. The template may have slits disposed either vertically or horizontally. Preferably a template with horizontal slits is used in combination with a template having vertical slits to form a grid with horizontal and vertical rules for blocking letters, i.e., for creating blocks, which ensure uniform size and spacing of letters drawn on the index card. The slits guide a writing instrument as a user draws straight lines on the surface of the card, one card at a time.

U.S. Patent Application 2005/0252019 to Gordon et al. discloses a quilting template with a flat, transparent, circular plastic disk approximately one eighth of an inch thick, a centermost conical aperture to allow a pencil point or pin to act as a pivot shaft, a plurality of concentrically and radially disposed cutouts spaced around the center aperture, a plurality of conically shaped apertures placed at strategic lations within the disk, and silk screened or otherwise printed indicators on the disk. A preferred embodiment includes the radial cutouts are approximately one quarter of one inch wide so that the outer arc of the cutout can be used as a retaining wall for guiding a standard hand operated cutting wheel and the inner arc can be used to draw a sew line that is an ideal distance from the edge of the fabric being cut.

U.S. Patent Application US 2006/0130723 to Henry discloses a simplification of the process of placing quilt ties in the quilt during the quilt making process. The quilt tie device contains a plurality of openings that identify locations in the quilt for quilt ties. A quilt maker places the quilt tie device over a top layer of the quilt. The quilt tie device is positioned such that the openings in the device are at locations on the quilt where the maker desires to place quilt ties. The quilt maker performs the quilt tie operation by tying a quilt tie in the quilt layer at each location in the quilt that indicated an opening in the quilt tie device.

U.S. Patent Application US 2007/0011900 Mastroianni discloses a template for use in cutting a good contained in a pan enabling the baked good to be cut into a plurality of substantially equi-sized pieces. The template includes a substantially planar body including a plurality of first slots and a plurality of second slots. The plurality of first slots are substantially parallel and are spaced approximately equidistantly across the body. The plurality of second slots are substantially parallel and are oriented obliquely with respect to the plurality of first slots.

U.S. Patent Application US 2007/0193051 to Winslow discloses a cutting template including a guide surface with a plurality of parallel first marking lines and a plurality of first grooves in the guide surface. The grooves form a substantially zigzag pattern across pathways defined by the first plurality of marking lines. A plurality of second marking lines are also in the guide surface, and define at least two sides of a predetermined shape. A plurality of second grooves are also in the in the guide surface, and define at least two sides of the predetermined shape.

U.S. Patent Application US 2008/0078094 to Baumann discloses a graphing template including a substantially square shaped, rigid piece of planar material. The planar material includes two elongated openings extending through the planar material and intersecting to form an origin and define four quadrants. The elongated openings are sufficiently large to accommodate a tip of a writing instrument such that a two dimensional graph may be generated by depositing the template onto a writing surface and thereafter inserting the tip of the writing instrument into the elongated openings and marking upon the writing surface to form an “x” axis and a “y” axis. The planar material includes an array of circularly-shaped holes located equidistance from one another in each quadrant and extending through the planar material. These circularly-shaped holes are arranged in equidistance rows and columns and are positioned in groups in the four quadrants. The planar material also comprises four straight outer edges, where at least one outer edge of the plane plate is comprised of ruler markings.

Although the aforementioned prior art have contributed to the construction of a single block, none of these prior art patents produce a plurality of quilt blocks simultaneously.

Therefore, it is an object of the present invention to provide an improved device and method for the simultaneous preparation of a plurality of quilt blocks.

Another object of this invention is to provide an improved device and method for the simultaneous preparation of a plurality of half square triangles to be utilized in a quilt.

Another object of this invention is to provide an improved device and method for preparation of quilt blocks having finer dimensional tolerance than individually prepared quilt blocks.

Another object of this invention is to provide an improved device and method for preparation of quilt blocks wherein an operator of low skill may produce high quality quilt blocks.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a quilt template for producing a plurality of quilt pieces. Each of the plurality of quilt pieces includes a first layer of material and a second layer of material. The quilt template receives a writing instrument for applying a mark on the first layer of material. The first layer of material and the second layer of material receive a plurality of piece stitching. The quilt template receives a cutting instrument for cutting the first layer of material and the second layer of material. The plurality of quilt pieces are coupled together by a plurality of quilt stitching for creating a quilt. The quilt template comprises a template plate defining a top surface and a bottom surface for positioning the bottom surface of the template plate over the first layer material and the second layer material. A marking groove traverses between the top surface to the bottom surface and receives the writing instrument for providing a reference for the plurality of first stitching and a reference for the cutting instrument. A first cutting groove traverses between the top surface to the bottom surface and receives the cutting instrument for cutting the first layer of material and the second layer of material. A second cutting groove traverses between the top surface to the bottom surface and receives the cutting instrument for cutting the first layer of material and the second layer of material. The first cutting groove and the second cutting groove define a parallel orientation. The marking groove is positioned between the first cutting groove and the second cutting groove. A first groove stop separates the marking groove from the first cutting groove. A second groove stop separates the marking groove from the second cutting groove. The marking groove and the first cutting groove define a first quilt pattern on the template plate. The marking groove and the second cutting groove define a second quilt pattern on the template plate.

In a more specific embodiment of the invention, a second marking groove traverses between the top surface to the bottom surface and receives the writing instrument for providing a second reference for the plurality of first stitching and a second reference for the cutting instrument. The second marking groove is positioned between the first cutting groove and the second cutting groove. A third groove stop separates the second marking groove from the first cutting groove. A fourth groove stop separates the second marking groove from the second cutting groove. The second marking groove and the first cutting groove define a third quilt pattern on the template plate. The second marking groove and the second cutting groove define a fourth quilt pattern on the template plate. The marking groove includes a forty five degree angle relative to the first cutting groove and the second cutting groove for defining a first half square triangle and a second half square triangle, respectively. The second marking groove includes a forty five degree angle with the first cutting groove and the second cutting groove for defining a third half square triangle and a fourth half square triangle, respectively.

The invention is also incorporated into the method for cutting a plurality of quilt pieces from a first layer of material and a second layer of material to construct a quilt. The method comprises adhering the first layer of material to the second layer of material. A quilt template is positioned over the first layer of material and the second layer of material. The first layer of material receives a marking from a writing instrument inserted into a marking groove. The quilt template is removed from the first layer of material and the second layer of material. The first layer of material and the second layer of material are secured together by stitching adjacent to the marking. The quilt template is repositioning over the first layer of material and the second layer of material such that the marking aligns with the marking groove of the quilt template. The first layer of material and the second layer of material are cut along a first cutting groove and a second cutting groove. The quilt template is rotated ninety degrees relative to the first layer of material and the second layer of material. The first layer of material and the second layer of material are cut along the first cutting groove and the second cutting groove. A straight edge is aligned with the marking. The first layer of material and the second layer of material are cut along said straight edge. The plurality of quilt pieces are secured together by stitching to construct the quilt.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 30:
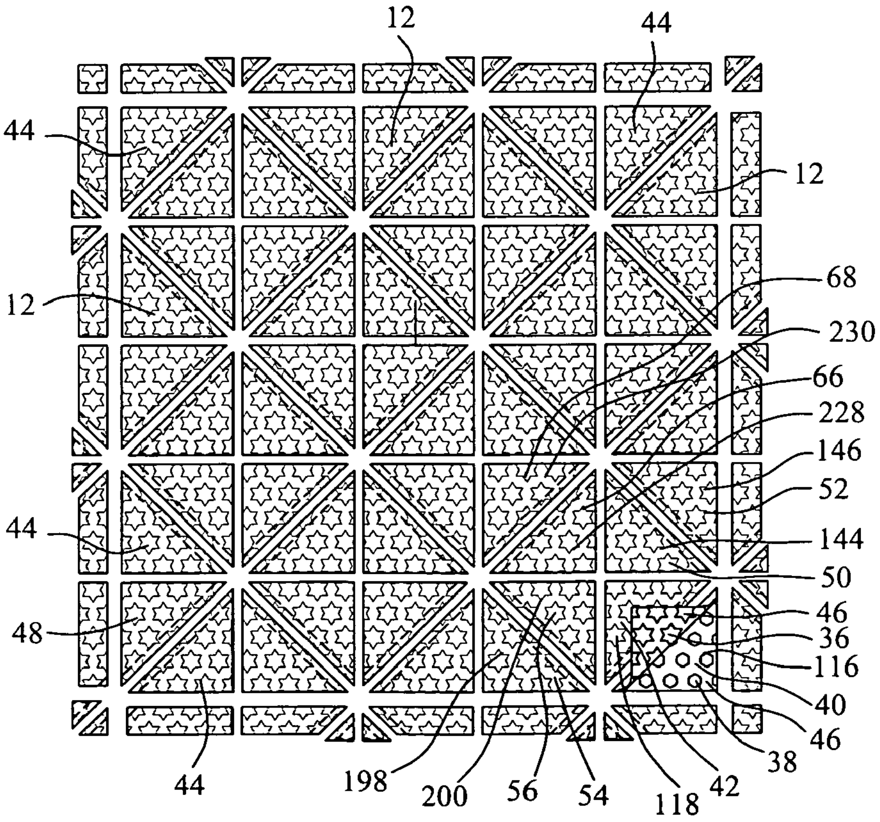
FIG. 30 is a view similar to FIG. 29 illustrating the plurality of quilt pieces spaced apart with a single quilt piece being positioned on the open position.
Figure 31:
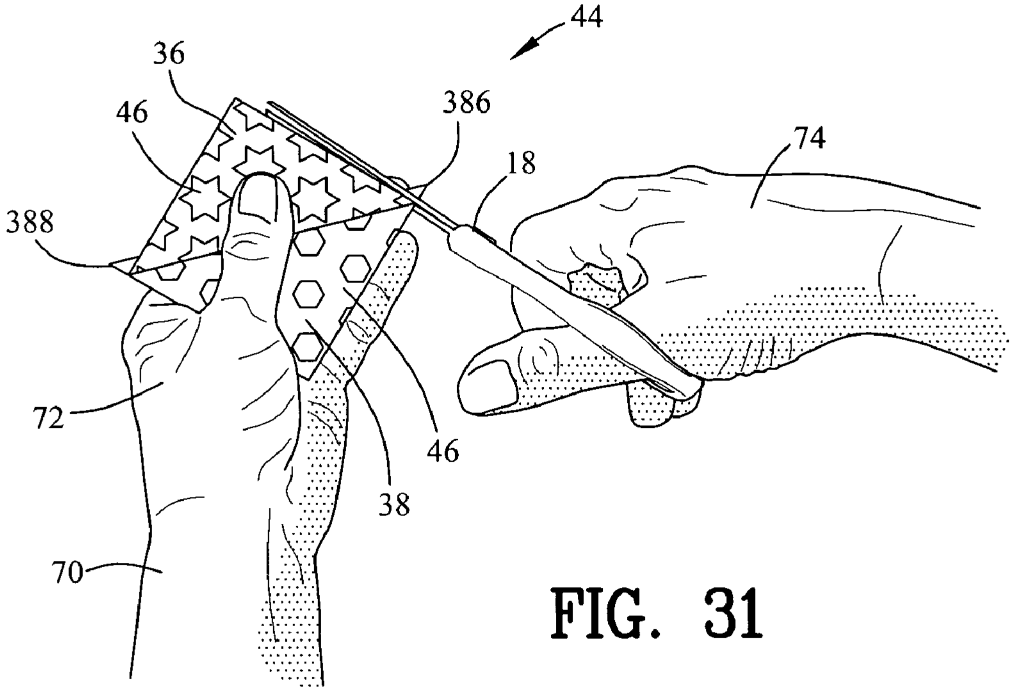
FIG. 31 is an enlarged view of the single quilt piece of FIG. 30 illustrating the first quilt tip being cut off.
Figure 32:
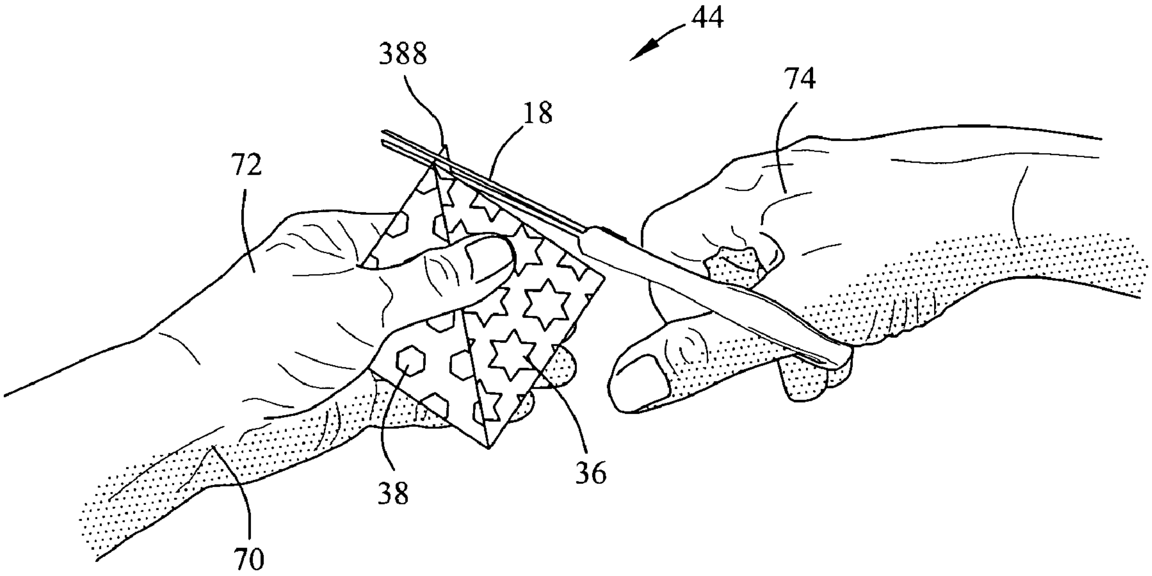
FIG. 32 is a view similar to FIG. 31 illustrating a second quilt tip being cut off for creating a square quilt piece.
Figure 39:
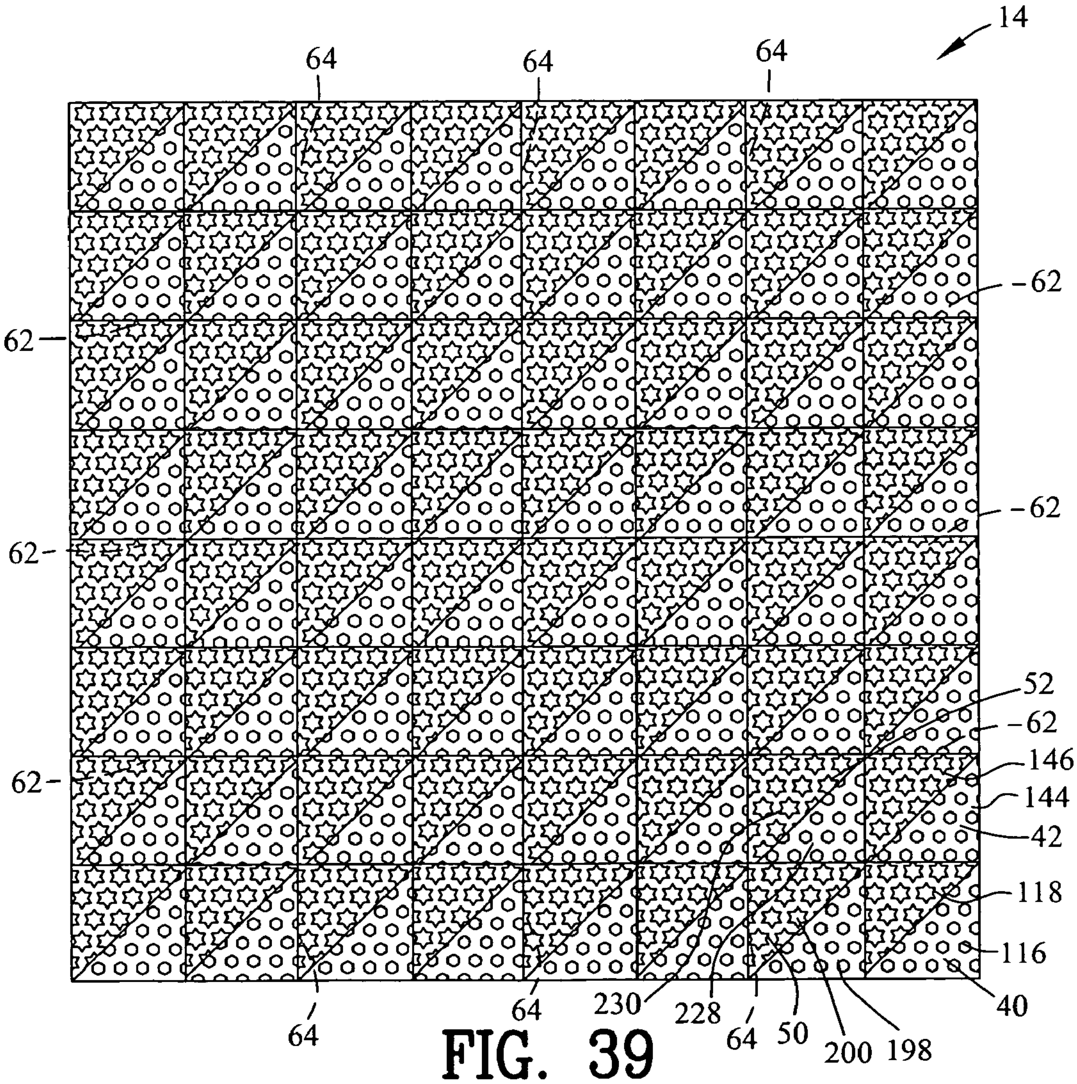
FIG. 39 is a view similar to FIG. 38 illustrating a plurality of quilt pieces joined together for creating a quilt.
Figure 45:
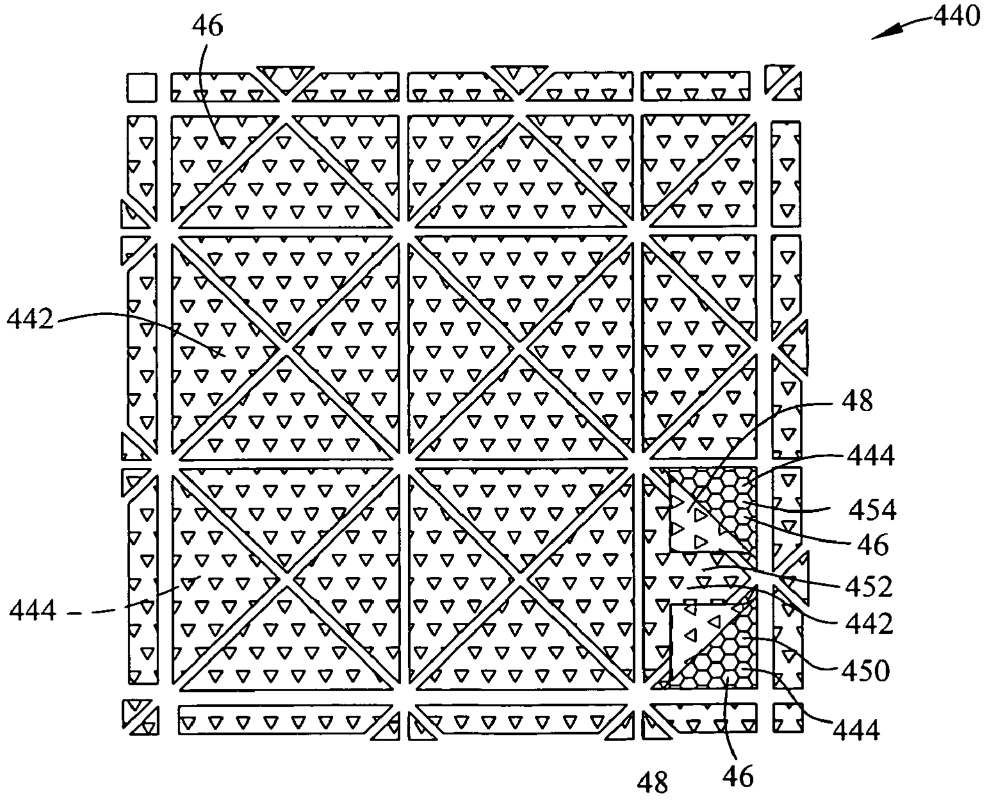
FIG. 45 is a view similar to FIG. 44 illustrating the plurality of quilt pieces spaced apart.
Figure 51:
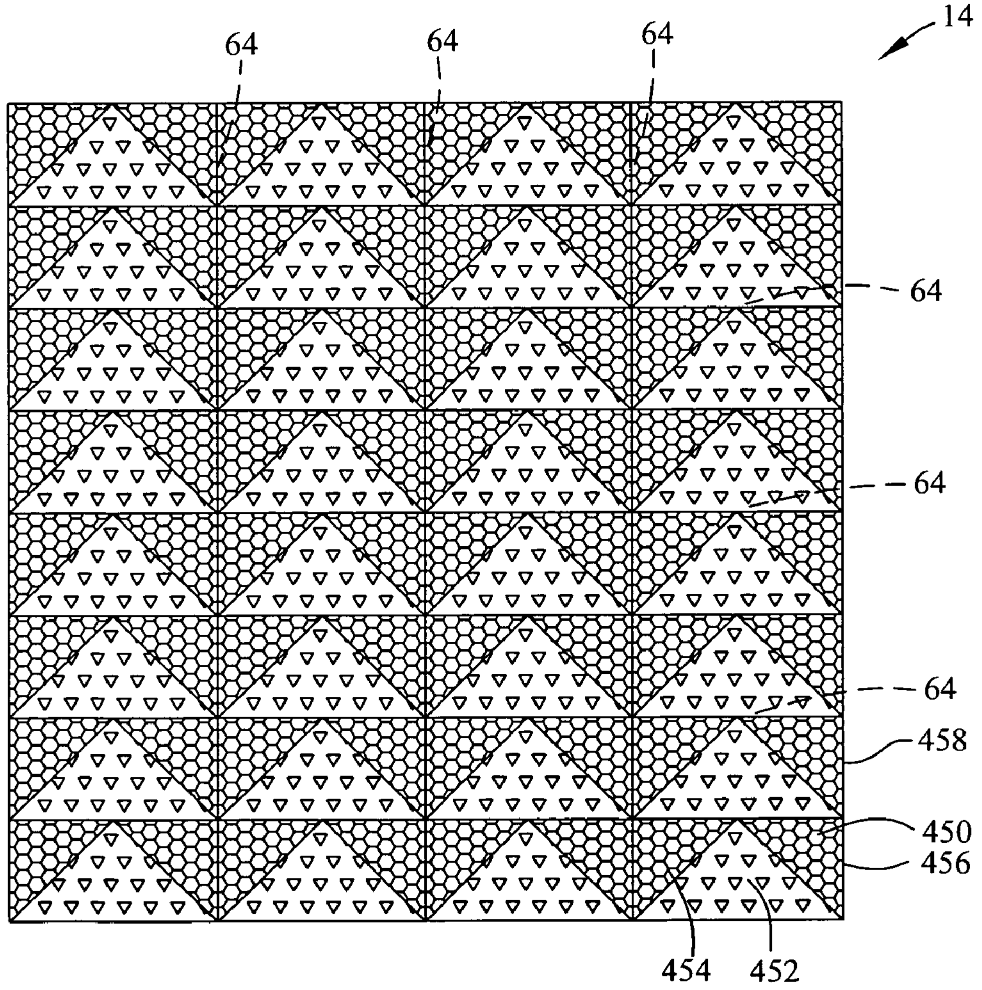
FIG. 51 is a view similar to FIG. 50 illustrating a plurality of flying goose quilt pieces joined together for creating a flying goose quilt.

FIGS. 1-8 are various views of a quilt template 10 for producing a plurality of quilt pieces 12 as shown in FIGS. 30 and 45. The plurality of quilt pieces 12 are coupled together to form a quilt 14 as shown in FIGS. 39 and 51. As seen in FIG. 39, the quilt 14 may include a first half square triangle 40 and a second half square triangle 42 to define a half square triangle block 44. The quilt 14 may further include a third half square triangle 50, fourth half square triangle 52, a fifth half square triangle 54, a six half square triangle 56, a seventh half square triangle 66, and an eighth half square triangle 68 for increasing the size of the half square triangle block 44. The plurality of square triangle blocks 44 are secured together to construct the quilt 14. The plurality of quilt pieces 12 include a first layer of material 36 and a second layer material 38.

The quilt template 10 comprises a template plate 20 defining a top surface 22 and a bottom surface 24. The quilt template 10 extends between a top edge 26, a bottom edge 28, a left edge 30 and a right edge 32. Preferably the quilt template 10 is constructed from a transparent polymeric material 34, however the quilt template 10 may be constructed from other materials that may or may not be transparent.

A marking groove 80 extends between a first end 82 and a second 84 and traverses between the top surface 22 to the bottom surface 24. The marking groove 80 receives a writing instrument 16 and provides a reference for a plurality of piece stitching 60 and a first reference 88 for the cutting instrument 18 that will described in more detail below. The marking groove 80 has a first thickness 86 for facilitating the receipt of the writing instrument 16 and the cutting instrument 18. The first thickness 86 may include one-thirty-seconds of an inch (1/32"). The marking groove 80 is positioned between a first reference line 160 and a second reference line 162 that is imprinted on the template plate 10. The first reference line 160 and the second reference line 162 are positioned to be aligned with the plurality of piece stitching 60. The first reference line 160 and the second reference line 162 are parallel relative to the marking groove 80. The distance between the marking groove 80 and the first reference line 160 and the second reference line 162 may be three-sixth (3/16) of an inch. The first reference line 160 and the second reference line 162 assist in positioning the template plate relative to the first layer of material that will described in more detail below.

A first cutting groove 90 extends from a first end 92 and a second end 94 and traverses between the top surface 22 to the bottom surface 24 for receives the cutting instrument 18 for cutting the first layer of material 36 and the second layer of material 38. The first cutting groove 90 has a second thickness 96 for facilitating the receipt of the cutting instrument 18.

A second cutting groove 100 extends from a first end 102 and a second end 104 and traverses between the top surface 22 to the bottom surface 24 and receives the cutting instrument 18 for cutting the first layer of material 36 and the second layer of material 38. The second cutting groove 100 has a third thickness 106 for facilitating the receipt of the cutting instrument 18.

The first cutting groove 90 and the second cutting groove 100 define a parallel orientation 110 wherein the marking groove 80 is positioned between the first cutting groove 90 and the second cutting groove 100. The quilt template 10 includes a first groove stop 112 for separating the first end 82 of the marking groove 80 from the first cutting groove 90. The quilt temple 10 further includes a second groove stop 114 for separating the second end 84 of the marking groove 80 from the second cutting groove 100. The marking groove 80 and the first cutting groove 90 define a first quilt pattern 116 on the template plate 10. The marking groove 80 and the second cutting groove 100 define a second quilt pattern 118 on the template plate 10. The marking groove 80 may include a non-perpendicular orientation 120 relative to both the first cutting groove 90 and the second cutting groove 100. More specifically, the marking groove 80 may include a forty five degree angle 122 with the first cutting groove 90 and the second cutting groove 100 for creating the first half square triangle 40 and the second half square triangle 42, respectively in the first layer of material 36 and the second layer of material 38.

The template plate 10 may further including a second marking groove 130. The second marking groove 130 extends between a first end 132 and a second end 134 and traverses between the top surface 22 to the bottom surface 24 for receiving the writing instrument 16 and providing a second reference 138 for the plurality of first stitching 60 and a second reference 138 for the cutting instrument 18 that will described in more detail below. The second marking groove 130 has a second thickness 136 for facilitating the receipt of the writing instrument 16 and the cutting instrument 18. The second thickness 136 may include one-thirty-seconds of an inch (1⁄32"). Preferably, the first thickness 86 and the second thickness 136 are equivalent. The second marking groove 130 is positioned between a third reference line 164 and a fourth reference line 166 that is imprinted on the template plate 10. The third reference line 164 and the fourth reference line 166 are positioned to be aligned with the plurality of piece stitching 60. The third reference line 164 and the fourth reference line 166 are parallel relative to the second marking groove 130. The distance between the second marking groove 130 and the third reference line 164 and the fourth reference line 166 may be three-sixth (3⁄16) of an inch. The third reference line 164 and the fourth reference line 166 assist in positioning the template plate relative to the first layer of material that will described in more detail below.

The second marking groove 130 is also positioned between the first cutting groove 90 and the second cutting groove 100. The quilt template 10 includes a third groove stop 140 for separating the first end 82 of the second marking groove 130 from the first cutting groove 90. The quilt temple 10 further includes a fourth groove stop 142 for separating the second end 84 of the second marking groove 130 from the second cutting groove 100. The second marking groove 130 and the first cutting groove 90 define a third quilt pattern 144 on the template plate 10. The second marking groove 130 and the second cutting groove 100 define a fourth quilt pattern 146 on the template plate 10. The second marking groove 130 may include a non-perpendicular orientation 148 relative to both the first cutting groove 90 and the second cutting groove 100. More specifically, the second marking groove 130 may include a forty five degree angle 150 with the first cutting groove 90 and the second cutting groove 100 for creating the first half square triangle 40 and the second half square triangle 42, respectively in the first layer of material 36 and the second layer of material 38. Preferably, the marking groove 80 and the second marking groove 130 are positioned on the quilt template 10 such that the marking groove 80 and the second marking groove 130 have a first mirror image orientation 152. More specifically, the marking groove 80 defines a ninety (90) degree angle 154 relative to the second marking groove 130.

The quilt template 10 may further include a third cutting groove 170 that extends from a first end 172 and a second end 174 and traverses between the top surface 22 to the bottom surface 24. The third cutting groove 170 receives the cutting instrument 18 for cutting the first layer of material 36 and the second layer of material 38. The third cutting groove 170 has a third thickness 176 for facilitating the receipt of the cutting instrument 18. The third cutting groove 170 and the second cutting groove 100 defining a parallel orientation 178.

A third marking groove 180 is positioned between the second cutting groove 100 and the third cutting groove 170. The third marking groove 180 extends between a first end 182 and a second end 84 and traverses between the top surface 22 to the bottom surface 24. The third marking groove 180 receives the writing instrument 16 and providing a reference for a plurality of piece stitching 60 and third reference 88 for the cutting instrument 18 that will described in more detail below. The third marking groove 180 has a third thickness 186 for facilitating the receipt of the writing instrument 16 and the cutting instrument 18. The third thickness 186 may include one-thirty-seconds of an inch (1⁄32"). The third marking groove 180 is positioned between a fifth reference line 190 and a sixth reference line 192 that is imprinted on the template plate 10. The fifth reference line 190 and the sixth reference line 192 are positioned to be aligned with the plurality of piece stitching 60. The fifth reference line 190 and a sixth reference line 192 are parallel relative to the third marking groove 180. The distance between the third marking groove 180 and the fifth reference line 190 and a sixth reference line 192 may be three-sixth (3⁄16) of an inch. The fifth reference line 190 and a sixth reference line 192 assist in positioning the template plate 10 relative to the first layer of material 36 that will described in more detail below.

The quilt template 10 may further include a fifth groove stop 194 for separating the first end 182 of the third marking groove 180 from the second cutting groove 100. The quilt temple 10 further includes a sixth groove stop 196 for separating the second end 184 of the third marking groove 180 from the third cutting groove 170. The third marking groove 180 and the second cutting groove 100 define a fifth quilt pattern 198 on the template plate 10. The third marking groove 180 and the third cutting groove 170 define a sixth quilt pattern 200 on the template plate 10. The third marking groove 180 may include a non-perpendicular orientation 202 relative to both the second cutting groove 100 and the third cutting groove 170. More specifically, the third marking groove 180 may include a forty five degree angle 204 with the second cutting groove 100 and the third cutting groove 170 for creating the fifth half square triangle 54 and the sixth half square triangle 56, respectively in the first layer of material 36 and the second layer of material 38.

The marking groove 80 and the third marking groove 180 are positioned on the quilt template 10 such that the marking groove 80 and the third marking groove 180 have a second mirror image orientation 207. More specifically, the marking groove 80 defines a ninety (90) degree angle 209 relative to the third marking groove 180.

The template plate 10 may further including a fourth marking groove 210. The fourth marking groove 210 extends between a first end 212 and a second end 214 and traverses between the top surface 22 to the bottom surface 24 for receiving the writing instrument 16 and providing a fourth reference 216 for the plurality of first stitching 60 and for the cutting instrument 18 that will described in more detail below. The fourth marking groove 210 has a fourth thickness 218 for facilitating the receipt of the writing instrument 16 and the cutting instrument 18. The fourth thickness 218 may include one-thirty-seconds of an inch (1/32"). Preferably, the first thickness 86, the second thickness 136, the third thickness 186 and the fourth thickness 218 are equivalent. The fourth marking groove 210 is positioned between a seventh reference line 220 and an eighth reference line 222 that is imprinted on the template plate 10. The seventh reference line 220 and the eighth reference line 222 are positioned to be aligned with the plurality of piece stitching 60. The seventh reference line 220 and an eighth reference line 222 are parallel relative to the fourth marking groove 210. The distance between the fourth marking groove 210 and the seventh reference line 220 and an eighth reference line 222 may be three-sixth (3/16) of an inch. The seventh reference line 220 and an eighth reference line 222 assist in positioning the template plate relative to the first layer of material that will described in more detail below.

The fourth marking groove 210 is also positioned between the second cutting groove 100 and the third cutting groove 170. The quilt template 10 includes a seventh groove stop 224 for separating the first end 212 of the fourth marking groove 210 from the second cutting groove 100. The quilt temple 10 further includes an eighth groove stop 226 for separating the second end 214 of the fourth marking groove 210 from the third cutting groove 170. The fourth marking groove 210 and the second cutting groove 100 define a seventh quilt pattern 228 on the template plate 10. The fourth marking groove 210 and the third cutting groove 170 define an eighth quilt pattern 230 on the template plate 10. The fourth marking groove 210 may include a non-perpendicular orientation 232 relative to both the second cutting groove 100 and the third cutting groove 170. More specifically, the fourth marking groove 210 may include a forty five degree angle 234 with the second cutting groove 100 and the third cutting groove 170 for creating a seventh half square triangle 66 and an eighth half square triangle 68, respectively in the first layer of material 36 and the second layer of material 38. Preferably, the third marking groove 180 and the fourth marking groove 210 are positioned on the quilt template 10 such that the third marking groove 180 and the fourth marking groove 210 have a third mirror image orientation 240. More specifically, the third marking groove 180 defines a ninety (90) degree angle 242 relative to the fourth marking groove 210.

The marking groove 80 and the second marking groove 130 construct a first marking column 250. The third marking groove 180 and the fourth marking groove 210 construct a second marking column 252. Additional, the marking groove 80 and the third marking groove 180 construct a first marking row 254. The second marking groove 130 and the fourth marking groove 210 construct a second marking row 256. As illustrated in FIGS. 1-8 the quilt template 10 may include a plurality of marking columns 260 and a plurality of marking rows 262 for increasing the number of plurality of quilt pieces 12 produced by the quilt template 10.

Figure 1:
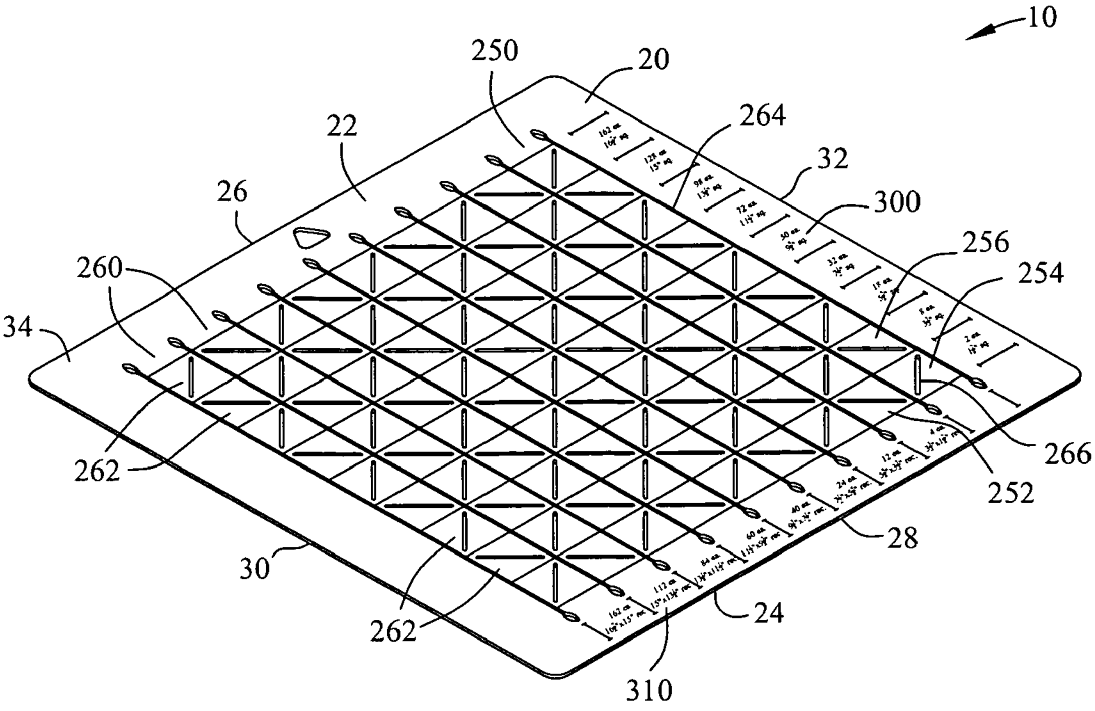
FIG. 1 is a top isometric view of a quilt template of the present invention for producing a plurality of quilt pieces.
Figure 2:
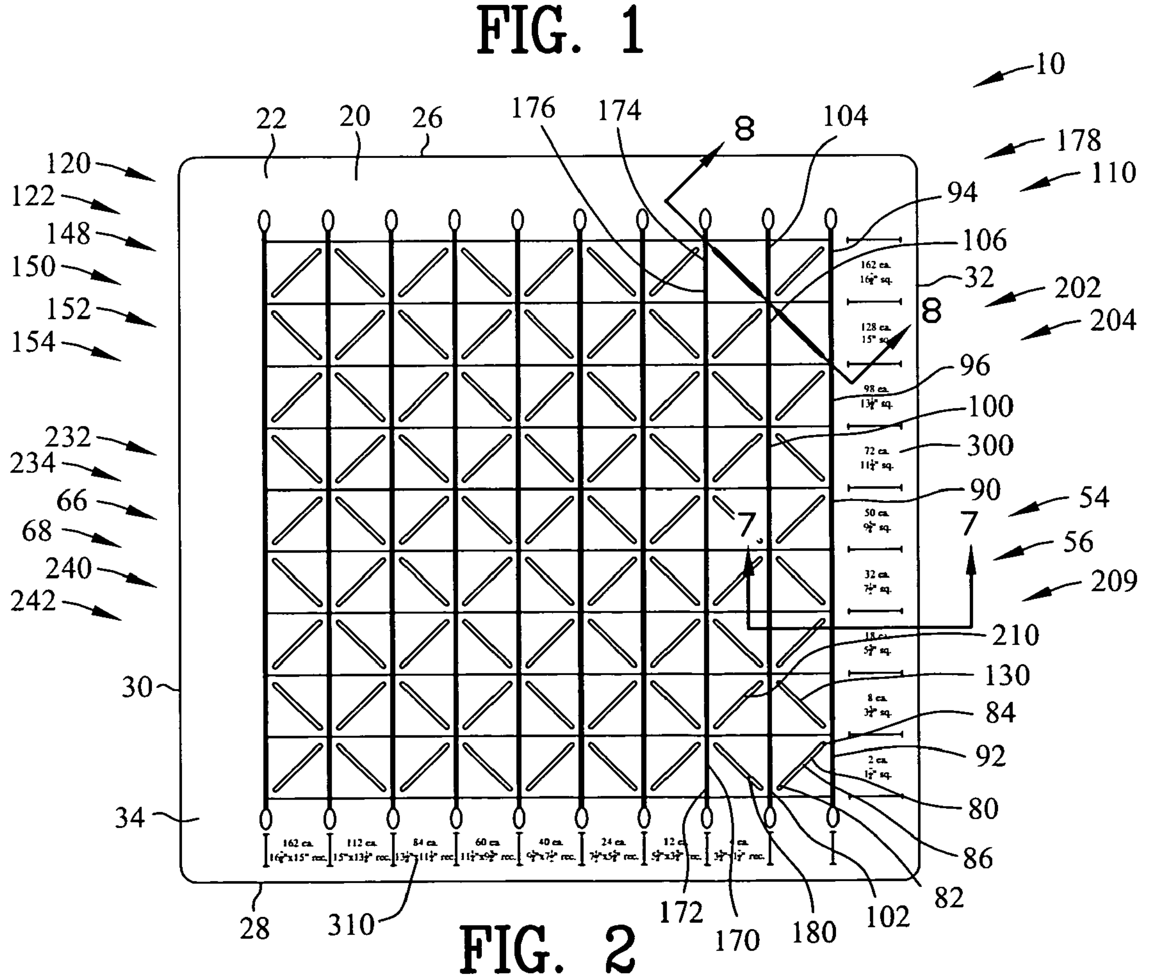
FIG. 2 is a top view of FIG. 1.
Figure 3:
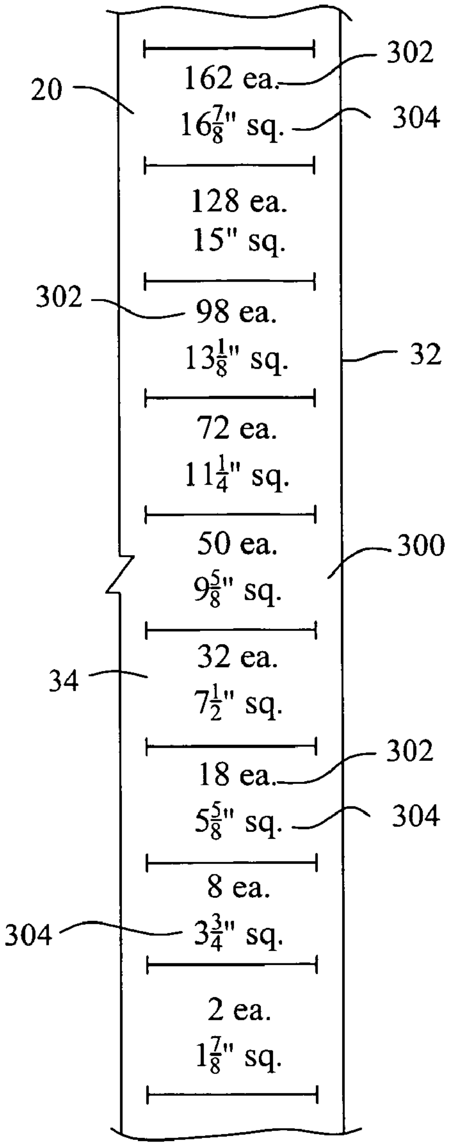
FIG. 3 is an enlarged view of a portion of FIG. 2 illustrating a vertical table.
Figure 4:
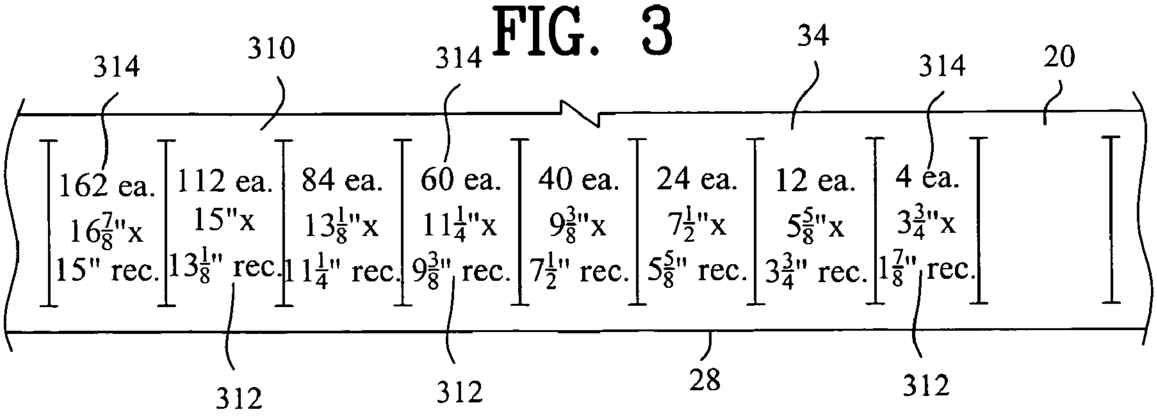
FIG. 4 is an enlarged view of a portion of FIG. 2 illustrating a horizontal table.
Figure 5:
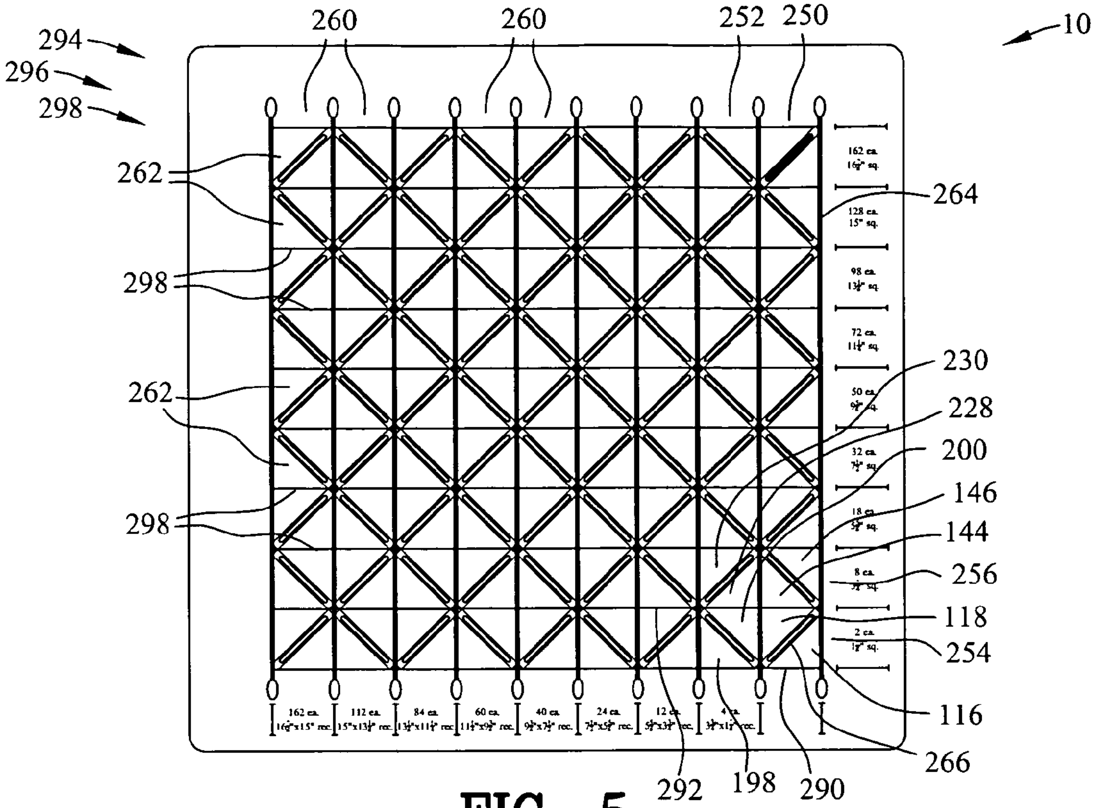
FIG. 5 is a view similar to FIG. 2 illustrating a marking groove positioned between a first reference line and a second reference line imprinted on the template plate.
Figure 5A:
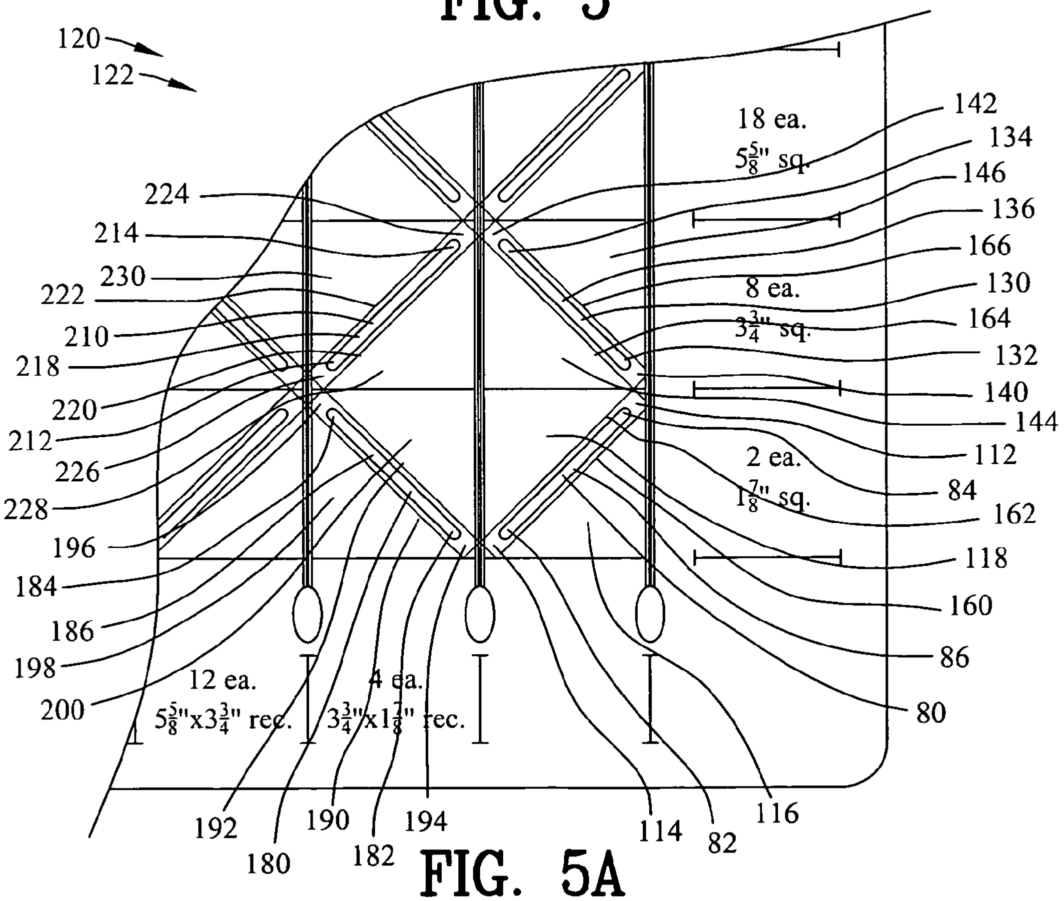
FIG. 5A is an enlarged view of a portion of FIG. 5.
Figure 6:
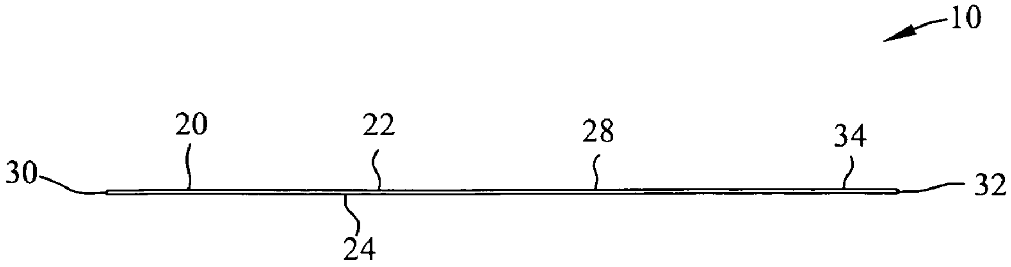
FIG. 6 is a side view of FIG. 2.
Figure 7:
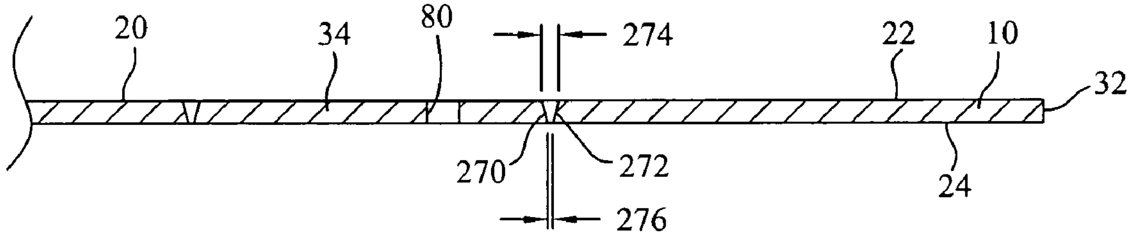
FIG. 7 is a sectional view along line 7-7 in FIG. 2.
Figure 8:
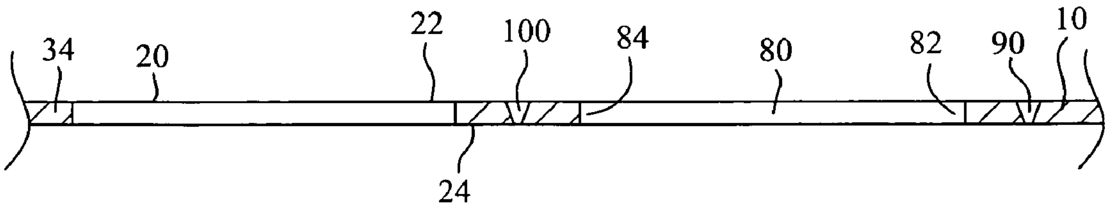
FIG. 8 is a sectional view along line 8-8 in FIG. 2.

Preferably, the marking groove 80, the second marking groove 130, the third marking groove 180 and the fourth marking groove 210 defines a first linear groove 264. Furthermore, first cutting groove, the second cutting groove and the third cutting groove define a second linear groove 266. As best seen in FIG. 7, the first cutting groove 90, the second cutting groove 100, and the third cutting groove 170 may include a first taper 270 and a second taper 272 for defining a first channel dimension 274 on the top surface 22 and a second channel dimension 276 on the bottom surface 24. The first channel dimension 274 is larger than the second channel dimension 276. The first taper 270 and the second taper 272 prevent lateral displacement of the cutting instrument 18 within the first cutting groove 90, the second cutting groove 100, and the third cutting groove 170.

The quilt template 10 may further include a first oval aperture 280 traversing between the top surface 22 to the bottom surface 24. The first oval aperture 280 is linked with the first end 92 of the first cutting groove 90 and the second cutting groove 100 for facilitating the insertion or removal of the cutting instrument 18 into the first cutting groove 90 and the second cutting groove 100. Similarly, a second oval aperture 282 traverses between the top surface 22 to the bottom surface 24. The second oval aperture 282 is linked with the second end 94 of the first cutting groove 90 and the second cutting groove 100 for facilitating the insertion or removal of the cutting instrument 18 into the first cutting groove 90 and the second cutting groove 100.

Alternatively to the first oval aperture 280, the quilt template 10 may further include a first tear shape aperture 284 traversing between top surface 22 to the bottom surface 24. The first tear shape aperture 284 is linked with the first end 92 of the first cutting groove 90 and the second cutting groove 100 for facilitating the insertion or removal of the cutting instrument 18 into the first cutting groove 90 and the second cutting groove 100. Similarly, a second tear shape aperture 286 traverses between the top surface 22 to the bottom surface 24. The second tear shape aperture 286 is linked with the second end 94 of the first cutting groove 90 and the second cutting groove 100 for facilitating the insertion or removal of the cutting instrument 18 into the first cutting groove 90 and the second cutting groove 100.

The quilt template 10 may further include a first cross reference line 290 and a second cross reference line 292. The first cross reference line 290 and the second cross reference line 292 are imprinted on the template plate 10 for aligning the template plate 10 relative to the first layer of material 36. The first cross reference line 290 and a second cross reference line 292 define a parallel orientation 294. The first cross reference line 290 and a second cross reference line 292 define a perpendicular orientation 296 with the first cutting groove 90 and the second cutting groove 100. Preferably, the first marking groove 80 is positioned between the first cross reference line 290 and the second cross reference line 292 for squaring the quilt template 10 to the first layer of material 36. The quilt template 10 may include a plurality of cross reference lines 298 for further assisting in squaring the quilt template 10 to the first layer of material 36.

The quilt template 10 may also include a vertical table 300 imprinted on the template plate 10 adjacent to the first cutting groove 90. The vertical table 300 indicates a vertical numerical size/dimensional text 302 of the plurality of quilt pieces 10 that are produced by the quilt template 10. The vertical table 300 may also indicate a number of plurality of quilt pieces text 304 of the number of plurality of quilt pieces 10 that are produced by the quilt template 10.

The quilt template 10 may also include a horizontal table 310 imprinted on the template plate 10 adjacent to the first cross reference line 290. The horizontal table 310 indicates a horizontal numerical size/dimensional text 312 of the plurality of quilt pieces 10 that are produced by the quilt template 10. The horizontal table 310 may also indicate a number of plurality of quilt pieces text 314 of the number of plurality of quilt pieces 10 that are produced by the quilt template 10.

Although the quilt template 10 is shown having a vertical table 300 and a horizontal table 310 including specific dimensions for the plurality of marking columns 260 and the plurality of marking rows 262, it should be understood that the quilt template 10 may include alternative vertical table dimensions and/or alternative horizontal table dimensions for changing the dimensions of the half square triangles 40, 42, 50, 52, 54, 56, 66 and 68.

FIGS. 9 thru 51 illustrate a method for utilizing the quilt template 10 for producing a plurality of quilt pieces 12 as shown in FIGS. 30 and 45. The plurality of quilt pieces 12 are coupled together to form a quilt 14 as shown in FIGS. 39 and 51. As seen in FIG. 39, the quilt 14 may include a first half square triangle 40 and a second half square triangle 42 to define a half square triangle block 44. The plurality of square triangle blocks 44 are secured together to construct the quilt 14.

Figure 9:
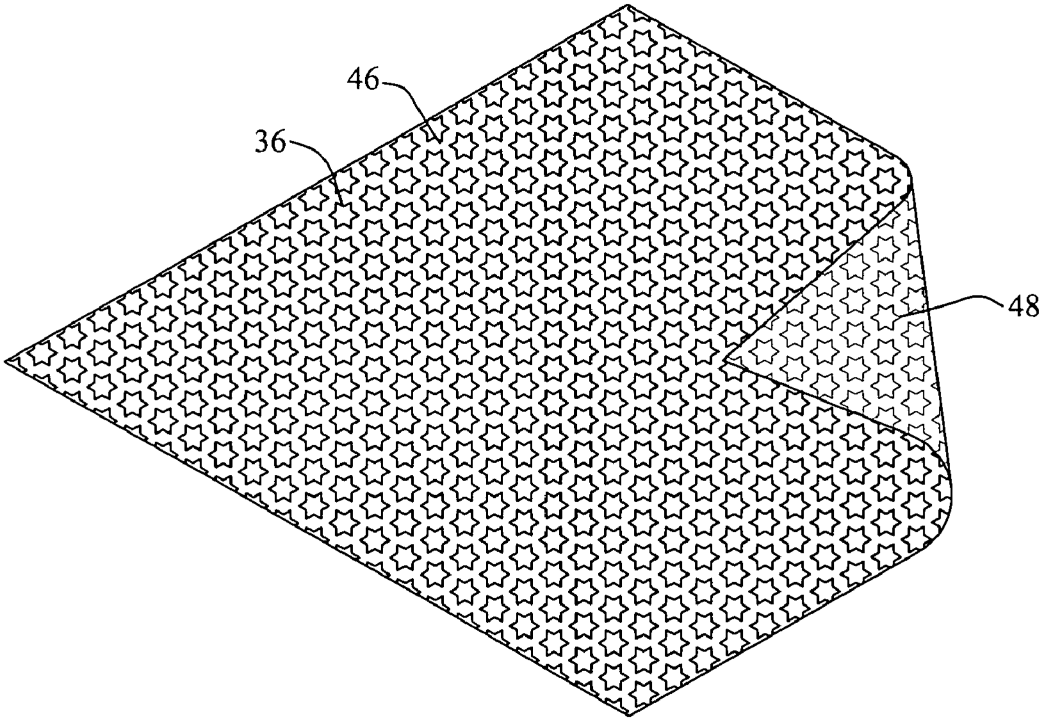
FIG. 9 is a top isometric view of a first layer of material.
Figure 10:
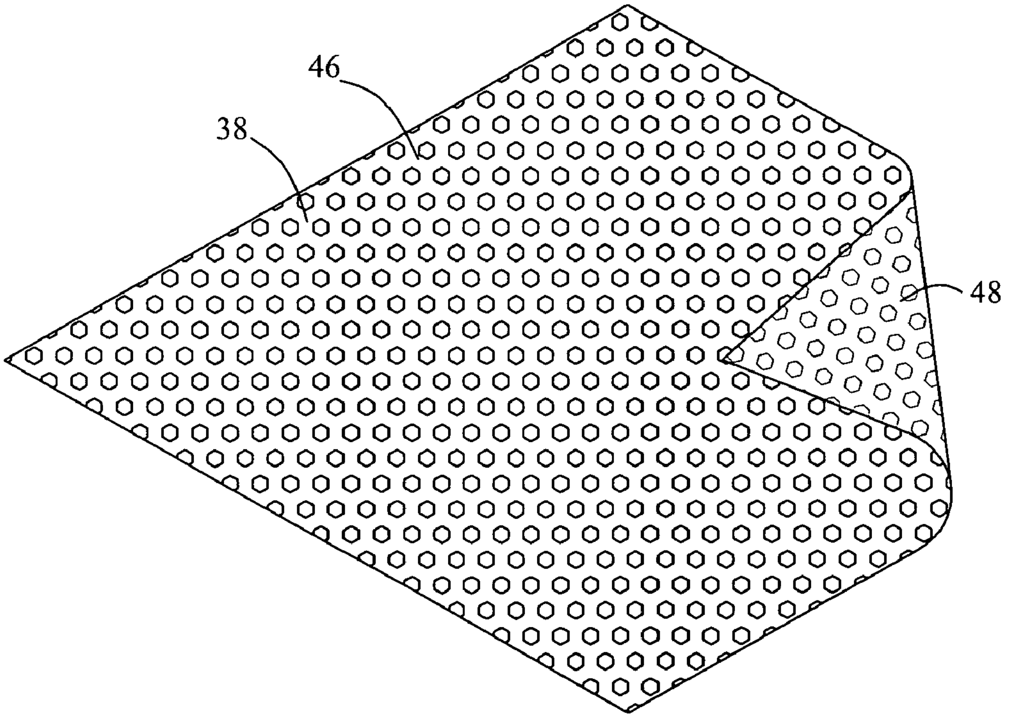
FIG. 10 is a top isometric view of a second layer of material.
Figure 11:
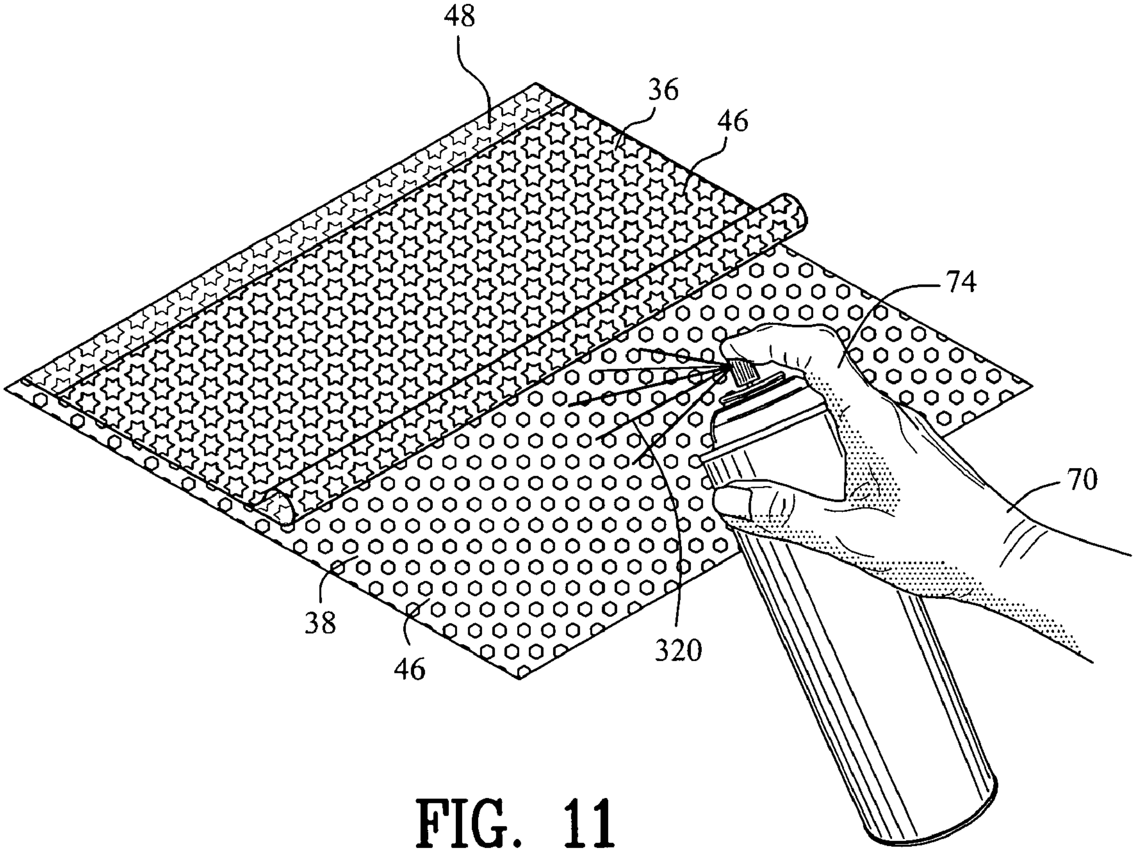
FIG. 11 is a view similar to FIG. 9 illustrating an adhesive being applied between the first layer of material and the second layer of material.

FIG. 9 illustrates the first layer of material 36 having a decorative side 46 and a rear side 48. FIG. 10 illustrates the second layer of material 38 also having a decorative side 46 and a rear side 48. The first layer of material 36 and the second layer of material 38 may include a cotton, polyester or other textiles. FIG. 11 illustrates the first layer of material 36 being positioned over the second layer of material 38 such that the rear side 48 of both the first layer of material 36 and the second layer of material 38 are adjacent to one another. One half of the first layer of material 36 is folded back upon itself in order for an adhesive 320 to be applied to the decorative side 46 of the second layer of material 38. Thereafter, the one half of the first layer of material 36 may be folded into engagement with the second layer of material 38. The opposing one half of the first layer of material 36 may then be folded back upon itself in order for the adhesive 320 to be applied to the opposing side of the decorative side 46 of the second layer of material 38. Thereafter, the opposing side of the first layer of material 36 may be folded into engagement with the second layer of material 38. A slight compress of force may then be applied to the first layer of material 36 for compressing the decorative sides 46 of the first layer of material 36 and the second layer of material 38 together. The adhesive 320 is intended to temporarily retain the first layer of material 36 against the second layer of material 38 during utilization of the quilt template 10. The adhesive 320 may include a temporary spray, wherein the first layer of material 36 may be separated from the second layer of material 38 by peeling the first layer of material 36 away from the second layer of material 38.

Figure 12:
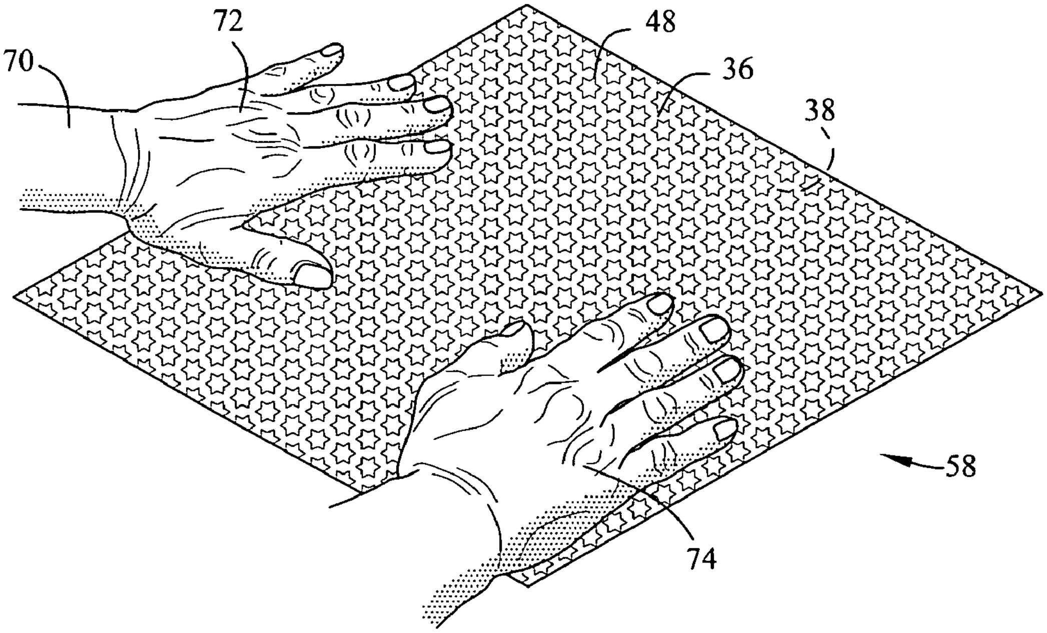
FIG. 12 is a view similar to FIG. 11 illustrating the first layer of material adhered to the second layer of material.

FIG. 12 illustrates the first layer of material adhered to the second layer of material wherein the rear side 48 of the first layer of material 36 is positioned face up. It may also be beneficial to adhere the rear side 48 of the second layer material to a working surface 58 by the adhesive 324 for maintaining the first layer of material 36 and the second layer of material 38 in a stationary position while the quilt template 10 is utilized.

Figure 13:
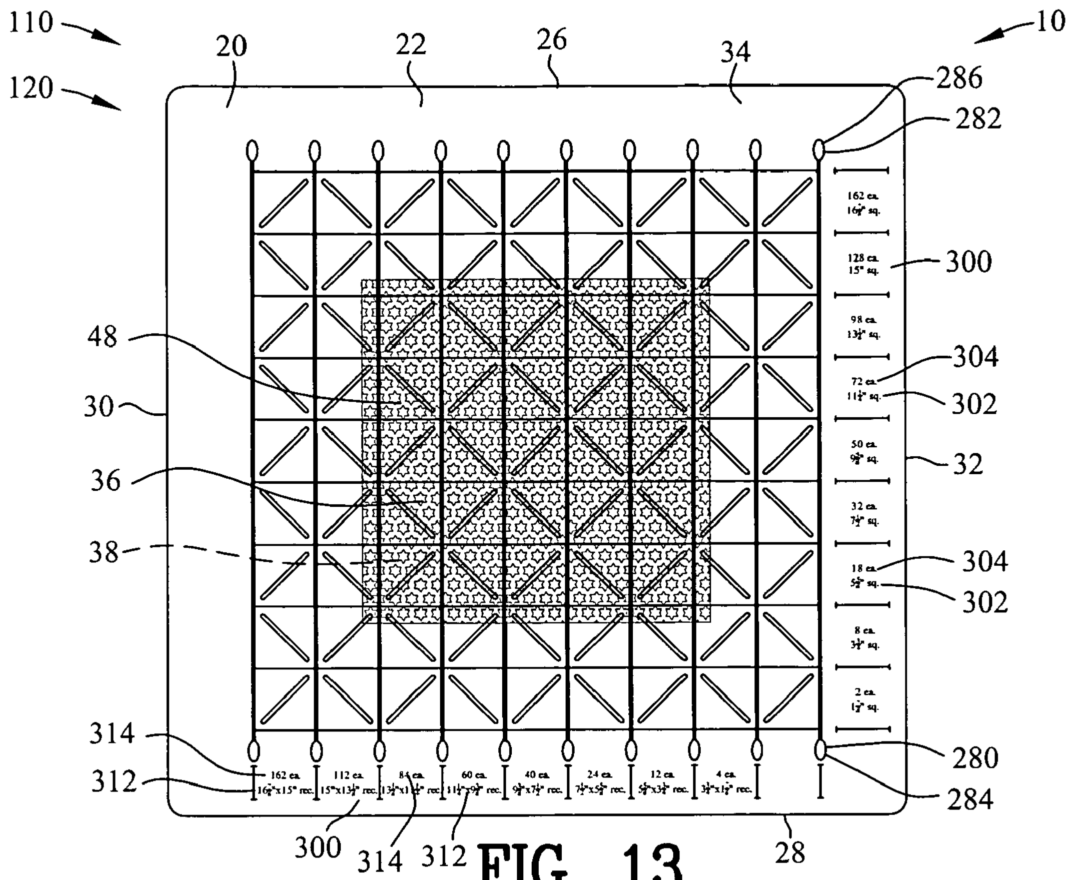
FIG. 13 is a view similar to FIG. 2 illustrating the quilt template being positioned over the first layer material and the second layer material.

FIG. 13 illustrates the quilt template 10 being positioned over the first layer of material 36 and the second layer material 38. More specifically the bottom surface 24 of the quilt template 10 is positioned adjacent to the decorative side 46 of the first layer of material 36. The quilt template 10 is centered upon the first layer of material 36 and the second layer of material 38 such that the greatest number of plurality of marking columns 260 and the greatest number of plurality of marking rows 262 of the quilt template 10 may be positioned over the first layer of material 36 and the second layer of material 38.

Figure 14:
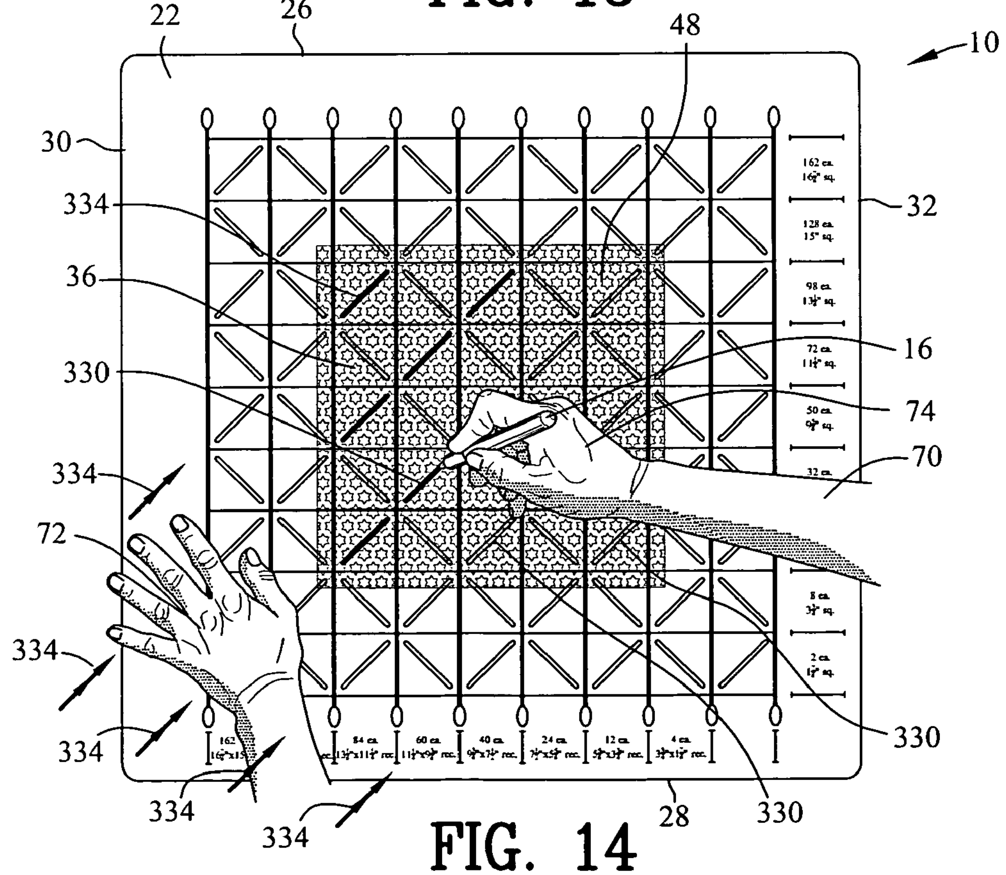
FIG. 14 is a view similar to FIG. 13 illustrating a first plurality of marks being applied to the first layer material by a writing instrument.

FIG. 14 illustrates a user 70 positioning a left hand 72 upon the top the quilt template 10 for applying a downward vertical force. The downward vertical force prevents the quilt template 10 from being displaced relative to the first layer of material 36 and the second layer of material 38. The user 70 grasps the writing instrument 16 with a right hand 74. The writing instrument 16 engages within a plurality of first marking grooves 330 for applying a first plurality of marks 332 to the rear side 48 of the first layer material 36. A first double arrow symbol 334 designates the locations where the writing instrument 16 will engage within the plurality of first marking grooves 330.

Figure 15:
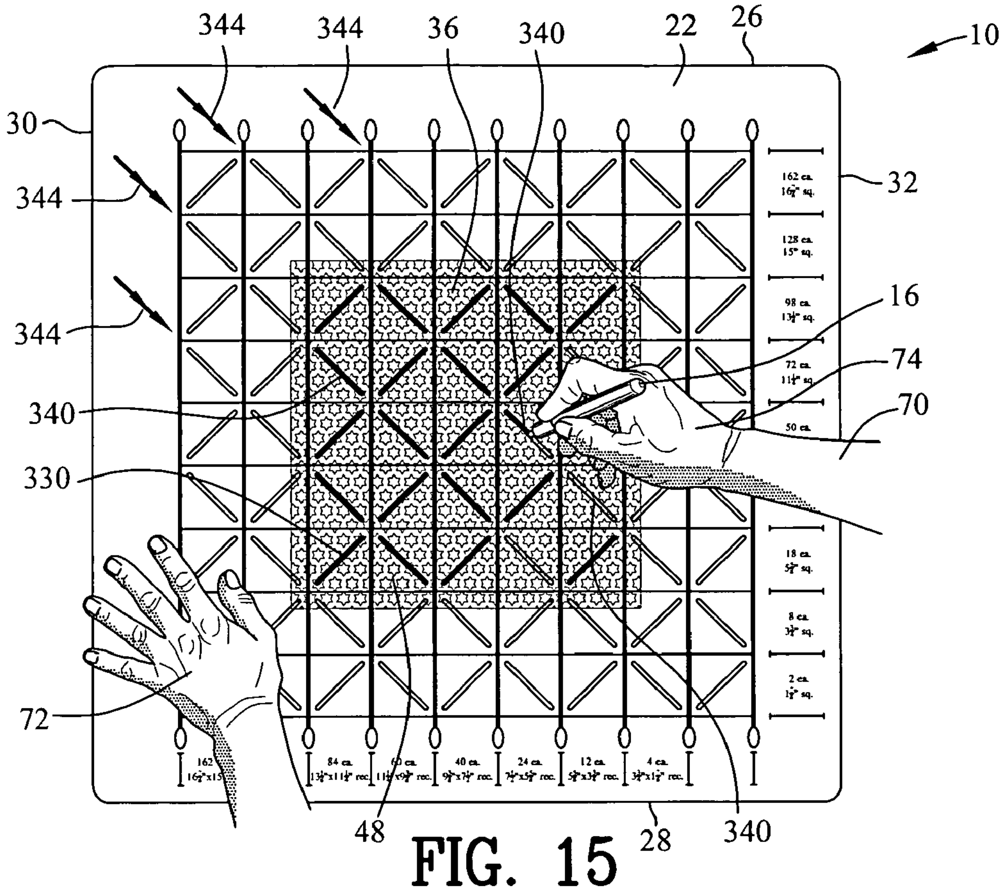
FIG. 15 is a view similar to FIG. 14 illustrating a second plurality of marks being applied to the first layer material by a writing instrument.

FIG. 15 illustrates the next step wherein the writing instrument 16 engages within a plurality of second marketing grooves for applying a second plurality of marks 342 to the rear side 48 of the first layer material 36. A second double arrow symbol 344 designates the locations where the writing instrument 16 will engage within the plurality of second marking grooves 340.

Figure 16:
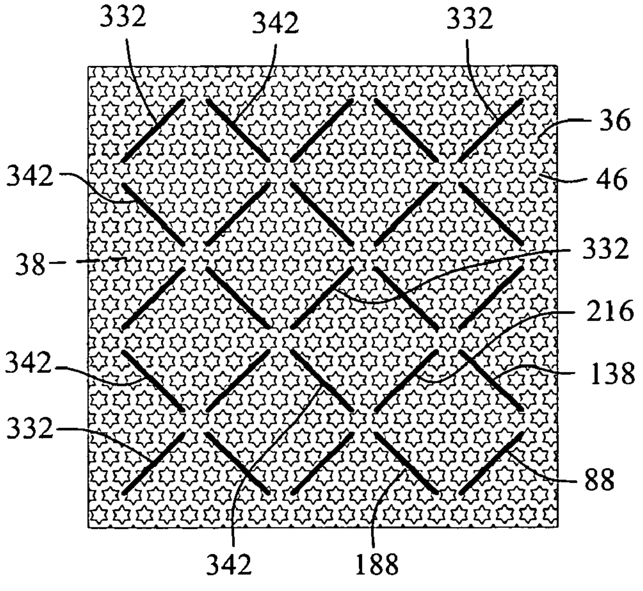
FIG. 16 is a view similar to FIG. 15 illustrating the quilt template removed from the first layer material to expose the first plurality of marks and the second plurality of marks.
Figure 17:
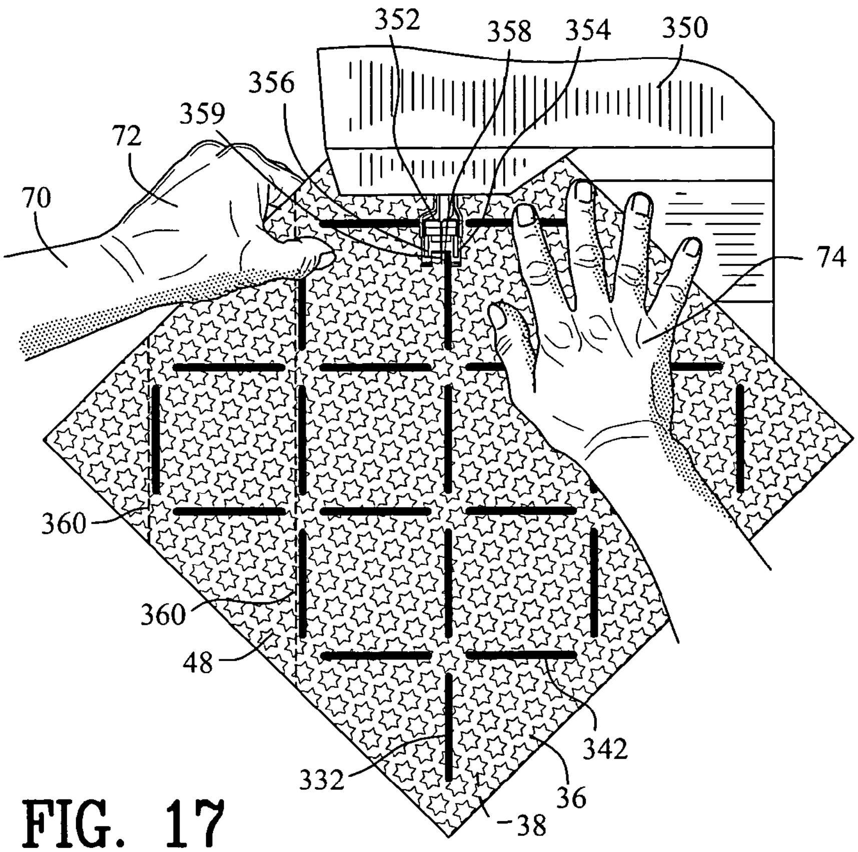
FIG. 17 is a view similar to FIG. 16 illustrating a first plurality of piece stitching being applied to the first layer of material and the second layer of material by a stitching device.
Figure 18:
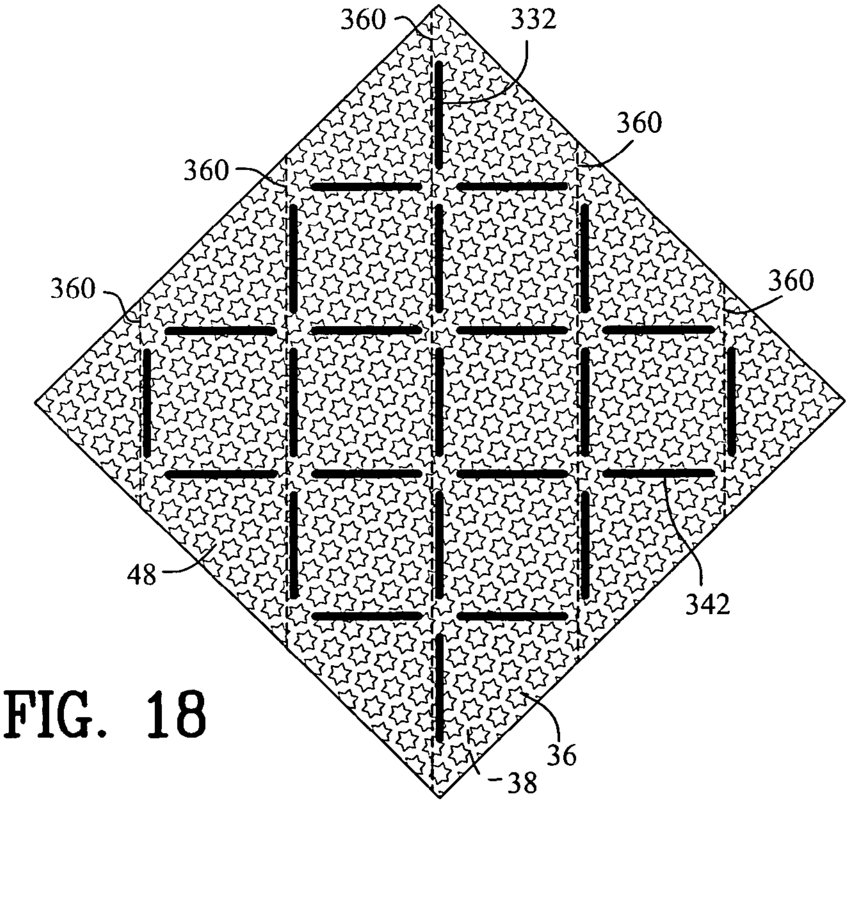
FIG. 18 is a view similar to FIG. 17 illustrating the first plurality of piece stitching securing the first layer of material to the second layer of material.

FIG. 16 illustrates the quilt template 10 removed from the first layer material 36 to expose the first plurality of marks 332 and the second plurality of marks 342. FIG. 17 illustrates the first layer material 36 and the second layer material 38 engaging in a stitching device 350. The stitching device 350 includes a needle 359 positioned within a sewing foot 352. The needle 359 dispenses the plurality of piece stitching 60. The sewing foot 352 includes a first arm 354 and a second arm 356 for defining a stitching area 358. In FIG. 17, the stitching device 350 is creating a first plurality of piece stitching 360. Preferably, the first plurality of marks 332 are positioned within the stitching area 358 and with the first arm 354 adjacent to the first plurality of marks 332 for offsetting the first plurality of piece stitching 360 relative to the first plurality of marks 332. FIG. 18 illustrates the first layer material 36 and the second layer material 38 after he stitching device 350 has completed the first plurality of piece stitching 360 and has disengaged with the stitching device 350.

Figure 19:
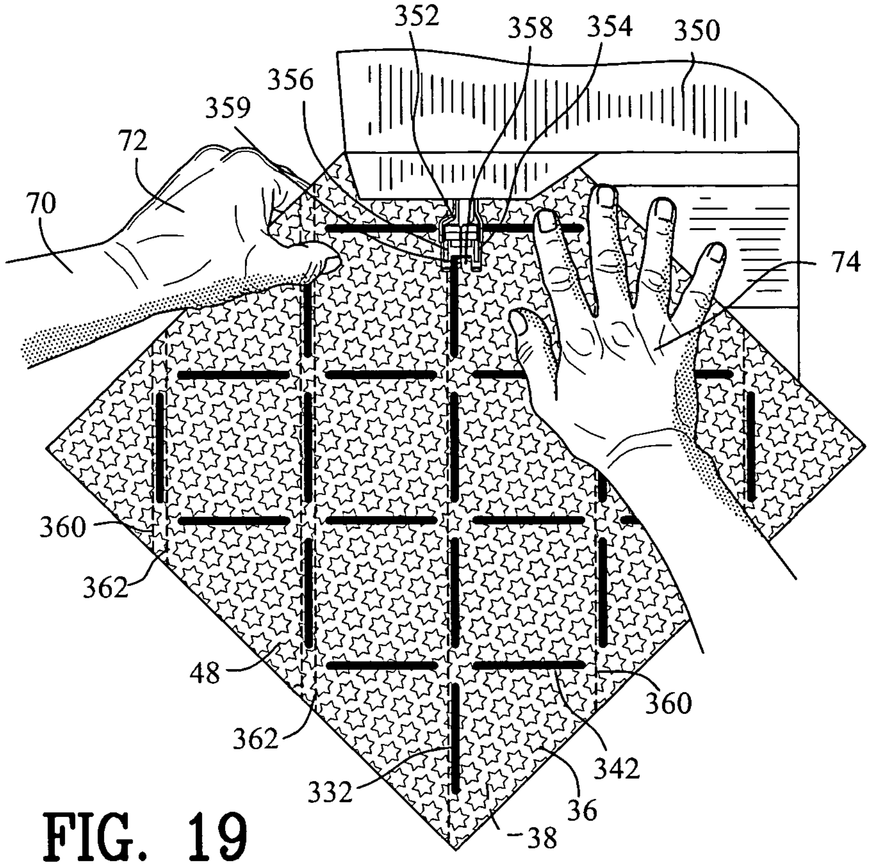
FIG. 19 is a view similar to FIG. 17 illustrating a second plurality of piece stitching being applied to the first layer of material and the second layer of material by the stitching device.
Figure 20:
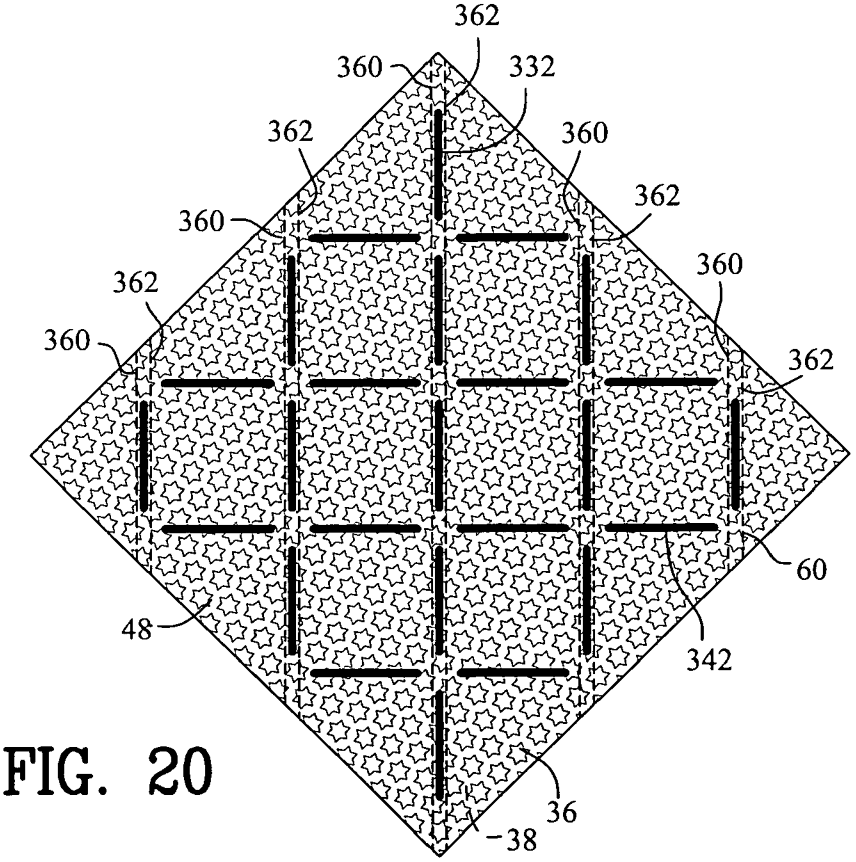
FIG. 20 is a view similar to FIG. 19 illustrating the second plurality of piece stitching securing the first layer of material to the second layer of material.

FIG. 19 illustrates the first layer material 36 and the second player material 38 again engaging with the stitching device 350. In FIG. 19, the stitching device 350 is creating a second plurality of piece stitching 362. Preferably, the first plurality of marks 332 are positioned within the stitching area 358 and with the second arm 356 adjacent to the first plurality of marks 332 for offsetting the second plurality of piece stitching 362 relative to the first plurality of marks 332. FIG. 20 illustrates the first layer material 36 and the second layer material 38 after the stitching device 350 has completed the second plurality of piece stitching 362 and has disengaged with the stitching device 350.

Figure 21:
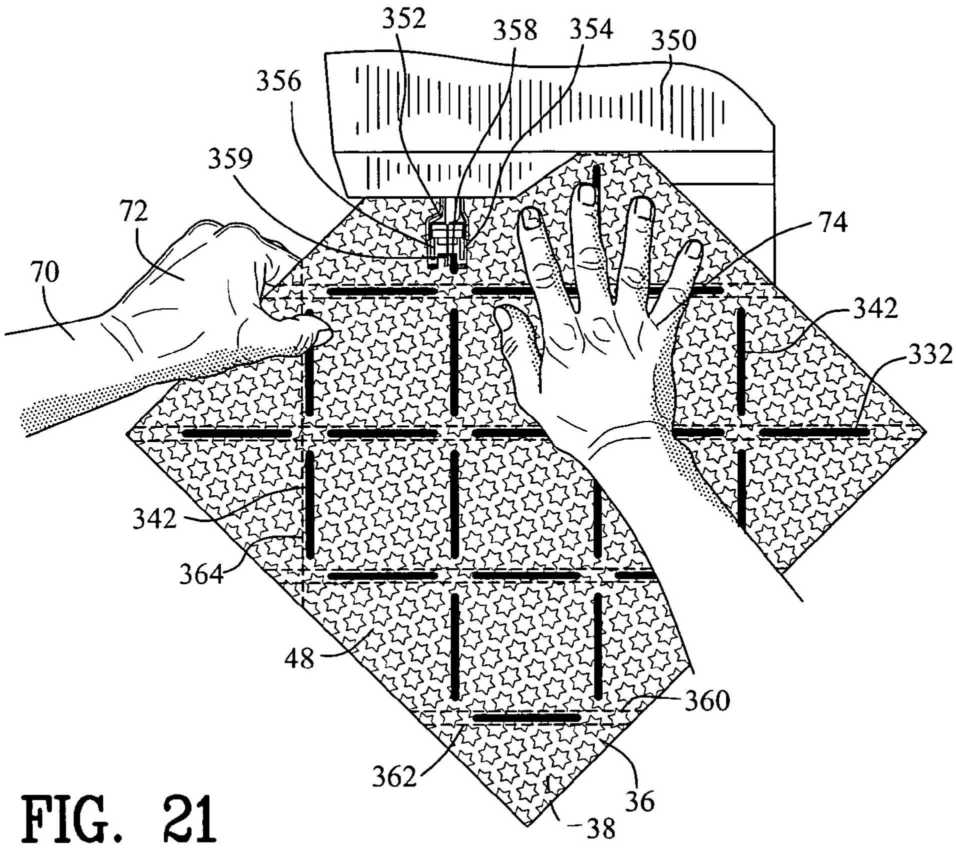
FIG. 21 is a view similar to FIG. 19 illustrating a third plurality of piece stitching being applied to the first layer of material and the second layer of material by the stitching device.
Figure 22:
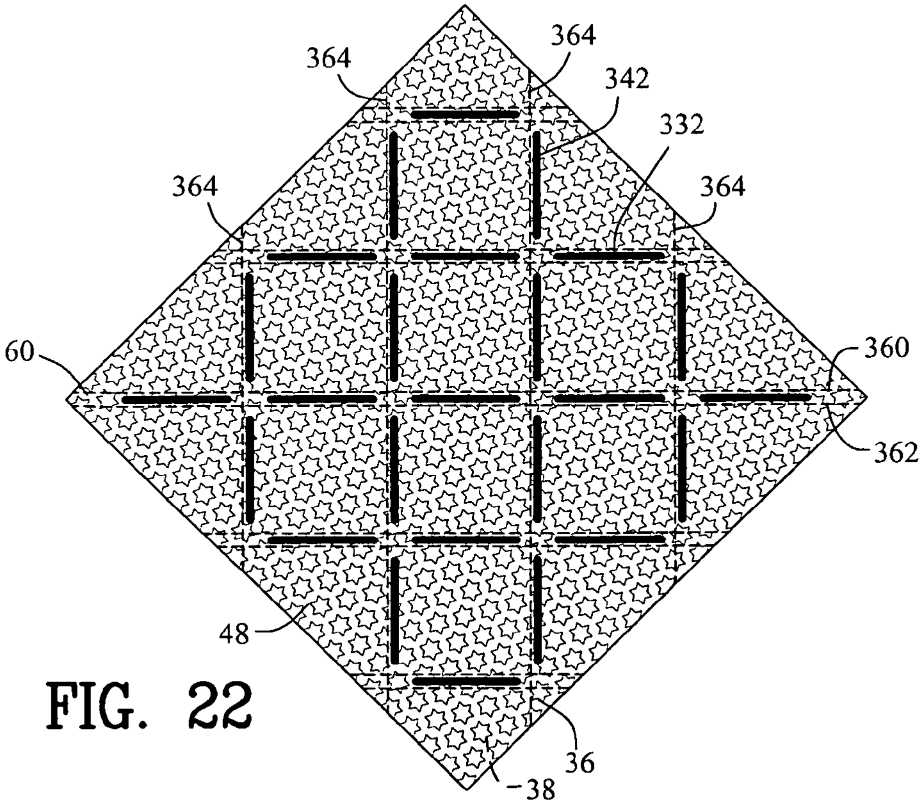
FIG. 22 is a view similar to FIG. 21 illustrating the third plurality of piece stitching securing the first layer of material to the second layer of material.

FIG. 21 illustrates the first layer material 36 and the second layer material 38 engaging in a stitching device 350. In FIG. 21, the stitching device 350 is creating a third plurality of piece stitching 364. Preferably, the second plurality of marks 342 are positioned within the stitching area 358 and with the first arm 354 adjacent to the second plurality of marks 342 for offsetting the third plurality of piece stitching 364 relative to the second plurality of marks 342. FIG. 22 illustrates the first layer material 36 and the second layer material 38 after the stitching device 350 has completed the third plurality of piece stitching 364 and has disengaged with the stitching device 350.

Figure 23:
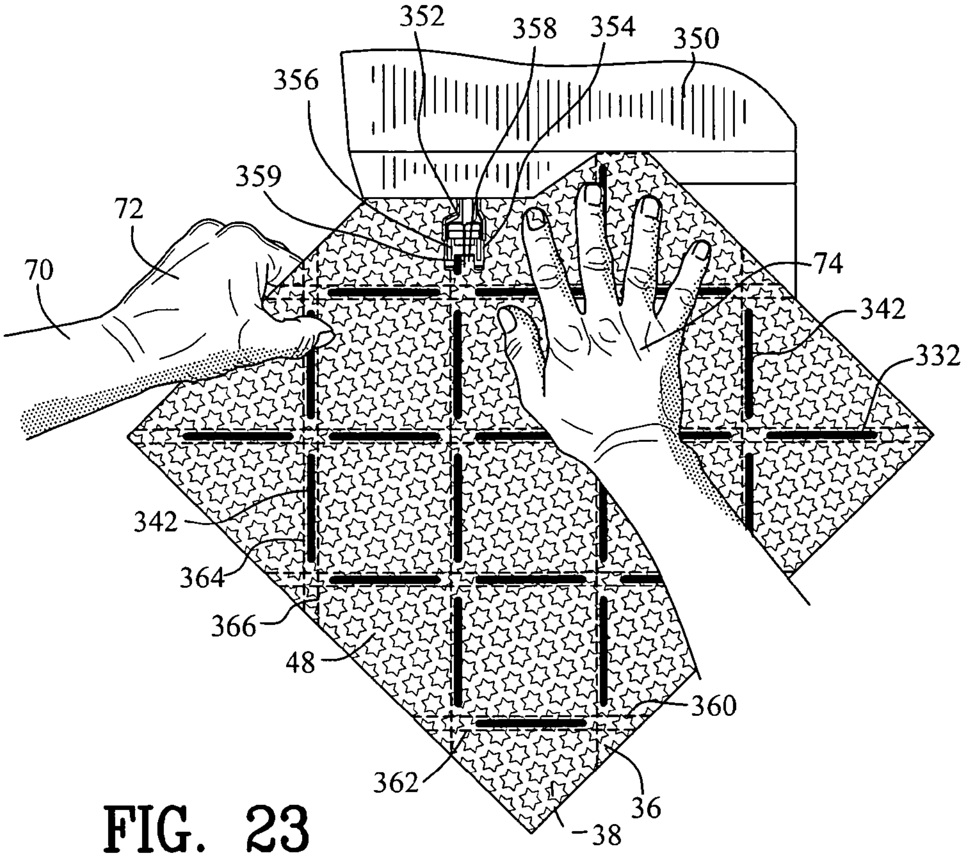
FIG. 23 is a view similar to FIG. 21 illustrating a fourth plurality of piece stitching being applied to the first layer of material and the second layer of material by the stitching device.
Figure 24:
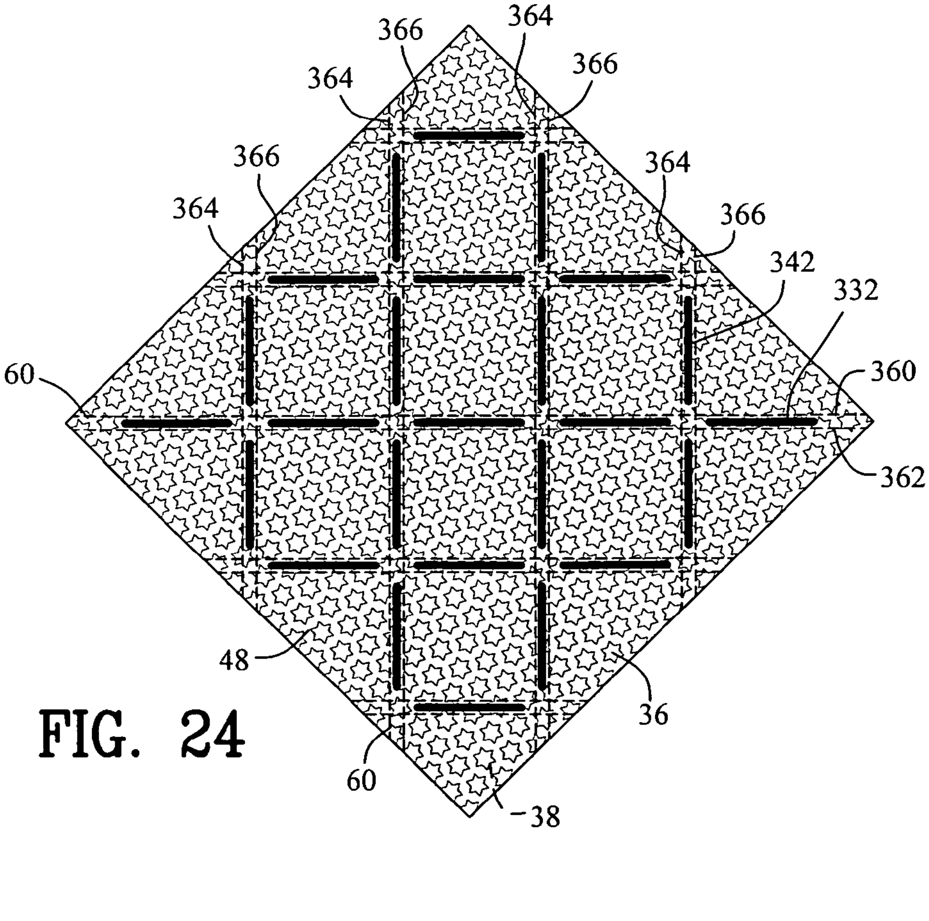
FIG. 24 is a view similar to FIG. 23 illustrating the fourth plurality of piece stitching securing the first layer of material to the second layer of material.

FIG. 23 illustrates the first layer material 36 and the second player material 38 again engaging with the stitching device 350. In FIG. 23, the stitching device 350 is creating a fourth plurality of piece stitching 366. Preferably, the second plurality of marks 342 are positioned within the stitching area 358 and with the second arm 356 adjacent to the second plurality of marks 342 for offsetting the fourth plurality of piece stitching 366 relative to the second plurality of marks 342. FIG. 24 illustrates the first layer material 36 and the second layer material 38 after the stitching device 350 has completed the fourth plurality of piece stitching 366 and has disengaged with the stitching device 350.

Figure 25:
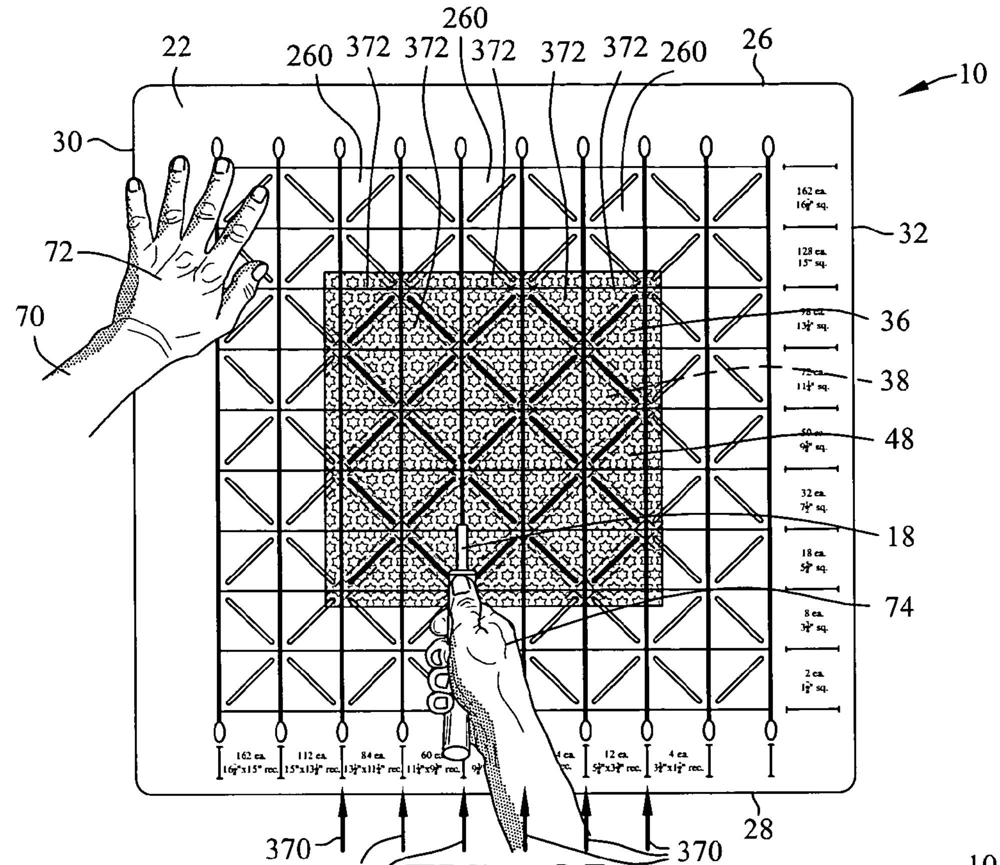
FIG. 25 is a view similar to FIG. 13 illustrating a cutting instrument engaging a plurality of cutting grooves.

FIG. 25 illustrates the quilt template 10 repositioned over the first layer material 36. It is critical that the quilt template 10 be repositioned on to the first layer material 36 in the exact location as established in FIG. 13. In order to facilitate the repositioning of the quilt template 10 upon the first layer material 36, the user 70 repositions the first plurality of marks 332 and the second plurality of marks 342 within the plurality of first marking grooves 330 and plurality of second marking grooves 340, respectively. In addition, the user 70 may utilize the first reference line 160, second reference line 162, third reference line 164, fourth reference line 166, fifth reference line 190, sixth reference line 192, seventh reference line 220, and eight reference line 222 for aligning over the first plurality of piece stitching 360, second plurality of piece stitching 362, third plurality of piece stitching 364 and fourth plurality of piece stitching 366. Once the quilt template 10 is properly aligned with the first layer material 36, a rotary cutting instrument 18 is inserted within the first cutting groove 90, second cutting groove 100, third cutting groove 170 and any further plurality of cutting grooves and propelled between the first end of the grooves 90, 100, and 170 to the second end of the grooves 90, 100, and 170 for creating a first plurality of cuts 370 within the first layer material 36 and the second layer material 38. The first plurality of cuts 370 creates a plurality of column pieces 372.

Figure 26:
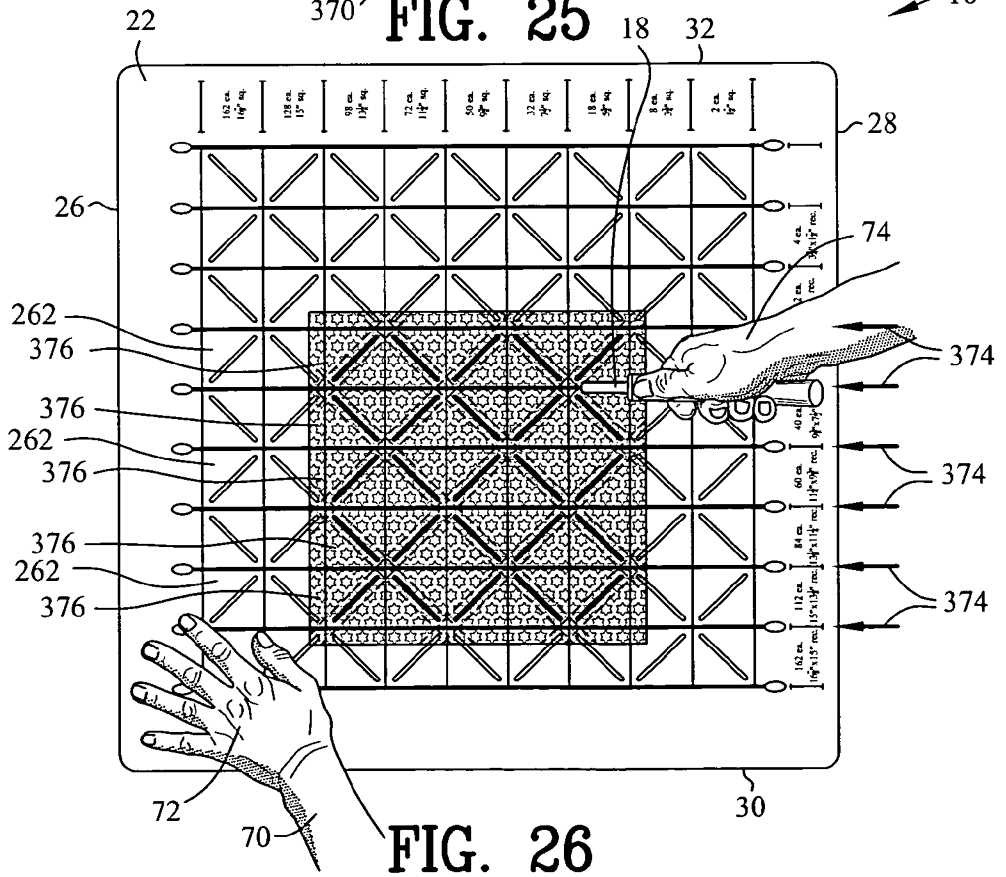
FIG. 26 is a view similar to FIG. 25 illustrating the quilt template being rotated ninety degrees relative to the first layer of material and the second layer of material and the cutting instrument engaging a plurality of cutting grooves.

FIG. 26 illustrates the quilt template 10 rotated 90° relative to the first layer of material 36 and the second layer of material 38. It is again critical that the quilt template 10 be repositioned on to the first layer material 36 such that the first plurality of marks 332 and the second plurality of marks 342 are aligned within the plurality of first marking grooves 330 and plurality of second marking grooves 340, respectively. In addition, the user 70 may utilize the first reference line 160, second reference line 162, third reference line 164, fourth reference line 166, fifth reference line 190, sixth reference line 192, seventh reference line 220, and eight reference line 222 for aligning over the first plurality of piece stitching 360, second plurality of piece stitching 362, third plurality of piece stitching 364 and fourth plurality of piece stitching 366. Once the quilt template 10 is properly aligned with the first layer material 36, a rotary cutting instrument 18 is again inserted within the first cutting groove 90, second cutting groove 100, third cutting groove 170 and any further plurality of cutting grooves and propelled between the first end of the grooves 90, 100, and 170 to the second end of the grooves 90, 100, and 170 for generating a second plurality of cuts 374 within the first layer material 36 and the second layer material 38. The second plurality of cuts 374 creates a plurality of square pieces 376.

Figure 27:
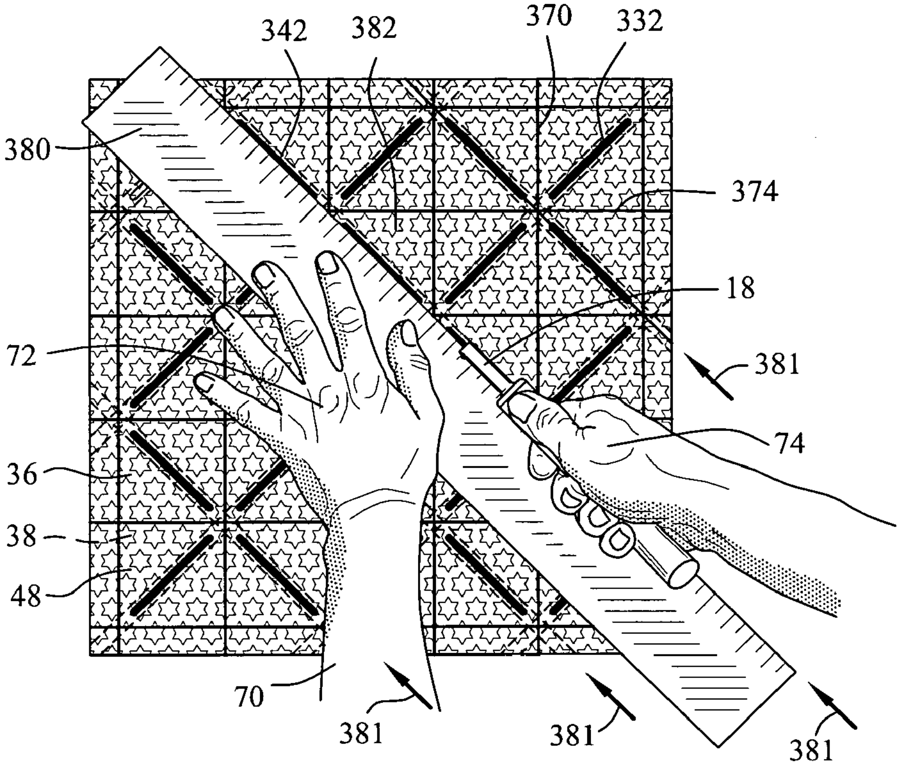
FIG. 27 is a view similar to FIG. 26 after the quilt template is removed from the first layer of material and the second layer of material and illustrating a straight edge aligned with the second plurality of marks and the cutting instrument cutting the first layer of material and the second layer of material along the straight edge.
Figure 28:
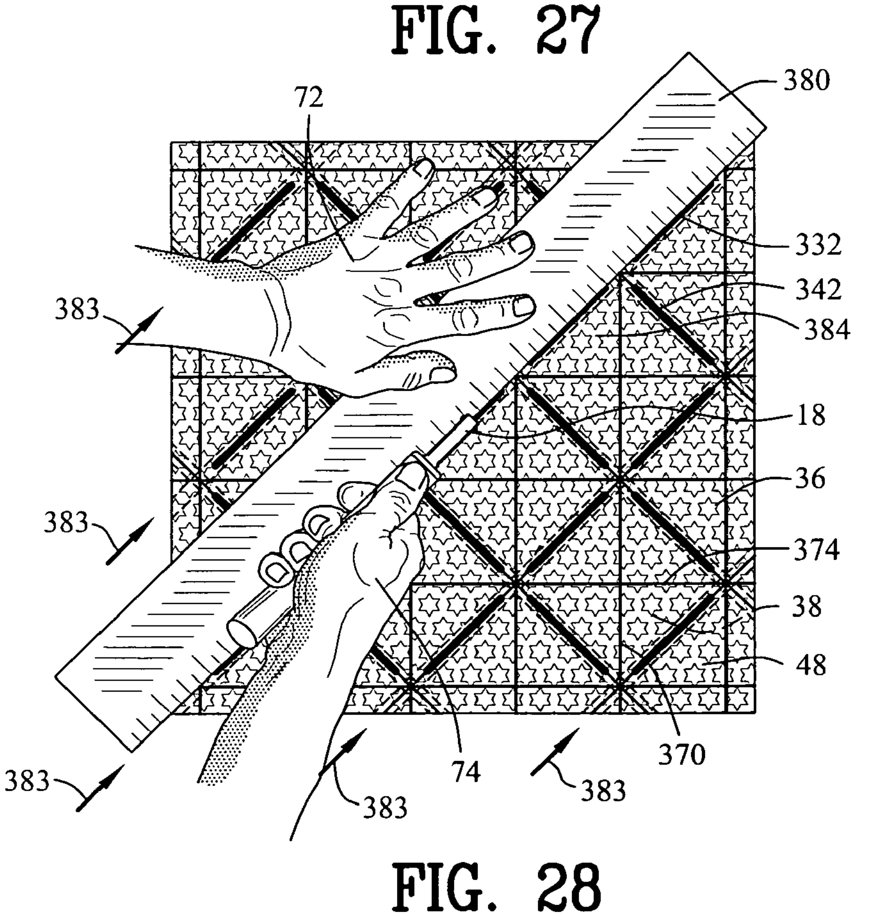
FIG. 28 is a view similar to FIG. 27 illustrating a straight edge aligned with the first plurality of marks and the cutting instrument cutting the first layer of material and the second layer of material along the straight edge.

FIG. 27 illustrates a quilting ruler 380 positioned over the first layer of material 36. The quilting ruler 380 is aligned with the plurality of first plurality of marks 332. Thereafter, the rotary cutting instrument 18 is propelled along the length of the first plurality of marks 332 for generating a third plurality of cuts 381 within the first layer material 36 and the second layer material 38. The third plurality of cuts creates a first set of half square triangle blocks 382. FIG. 28 illustrates the quilt ruler 380 rotated 90° relative to the first layer of material 36 and the second layer of material 38. The quilt ruler 380 is aligned with the second plurality of marks 342. Thereafter, the rotary cutting instrument 18 is propelled along the length of the second plurality of marks 342 for generating a fourth plurality of cuts 383 within the first layer material 36 and the second layer material 38. The fourth plurality of cuts 383 create a second set of half square triangle blocks 384.

Figure 29:
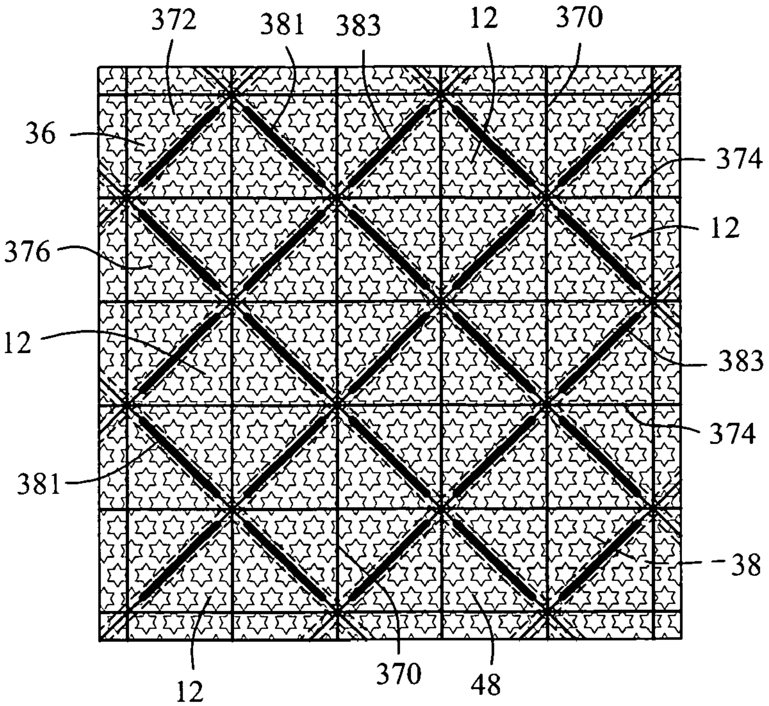
FIG. 29 is a view similar to FIG. 28 after the straight edge is removed from the first layer of material and the second layer of material.

FIG. 29 illustrates the first layer of material 36 and the second layer of material 38 wherein the rotary cutting instrument 18 has completed cutting out the half square triangle blocks 44. FIG. 30 illustrates the plurality of half square triangle blocks 44 being spaced apart. Upon opening of the each of the half square triangle blocks 44, a first quilt tip 386 and a second quilt tip 388 extend from the half square triangle blocks 44. Before coupling each of the half square triangle blocks 44 together, it may be preferable to remove the first quilt tip 386 and the second quilt tip 388 by a cutting instrument 18. The removal of the first quilt tip 386 and the second quilt tip 388 provides a squared corner.

Figure 33:
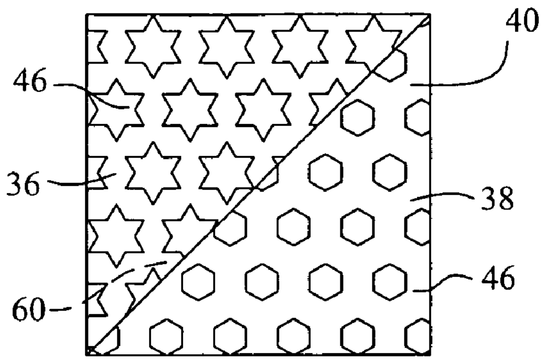
FIG. 33 is a top view of a single quilt piece as shown in FIG. 32.
Figure 34:
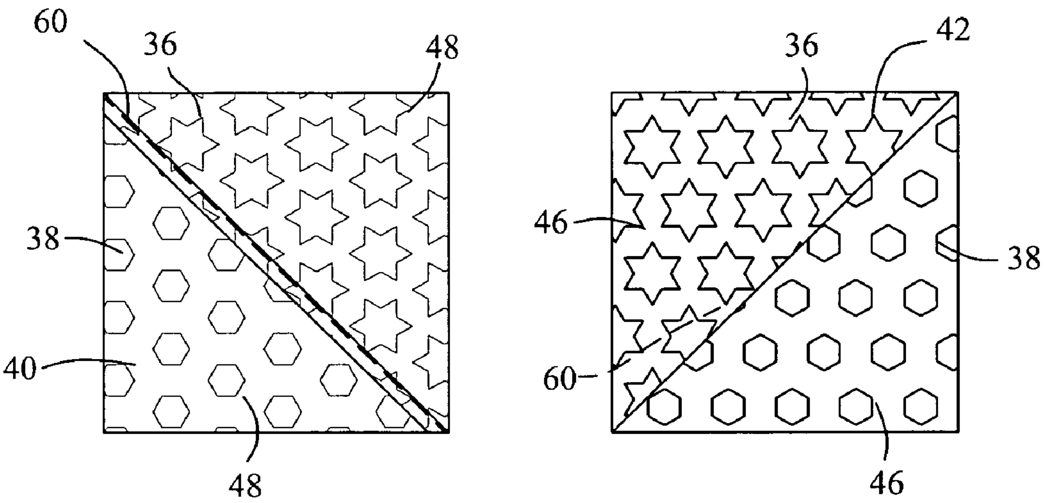
FIG. 34 is a bottom view of a first quilt piece and a top view of a second quilt piece.
Figure 35:
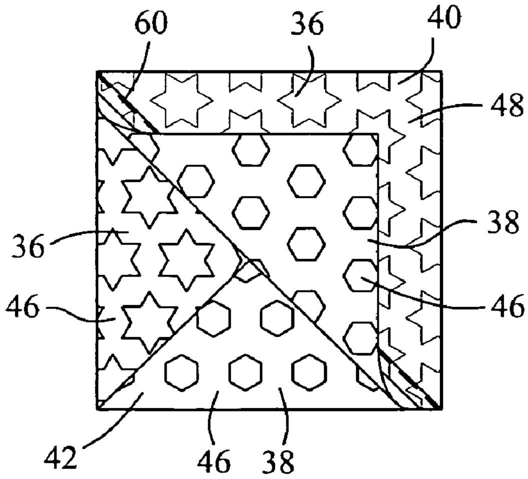
FIG. 35 is a view similar to FIG. 34 illustrating the first quilt piece being positioned over the second quilt piece.

FIG. 33 illustrates the completed first half square triangle 40 including the first layer of material 36 and the second layer of material 38 coupled by the plurality of piece stitching 60. FIG. 34 illustrates the first half square triangle 40 adjacent to the second half square triangle 42. The first half square triangle 40 is inverted such that the rear side 48 of the first layer of material 36 and the second layer material 38 are faceup. The second half square triangle, 42 is positioned such that the decorative side 46 of the first half square triangle 40 and the second half square triangle 42 are faceup. FIG. 35 illustrates the first half square triangle 40 over laying the second half square triangle 42 with the same orientation as shown in FIG. 34.

Figure 36:
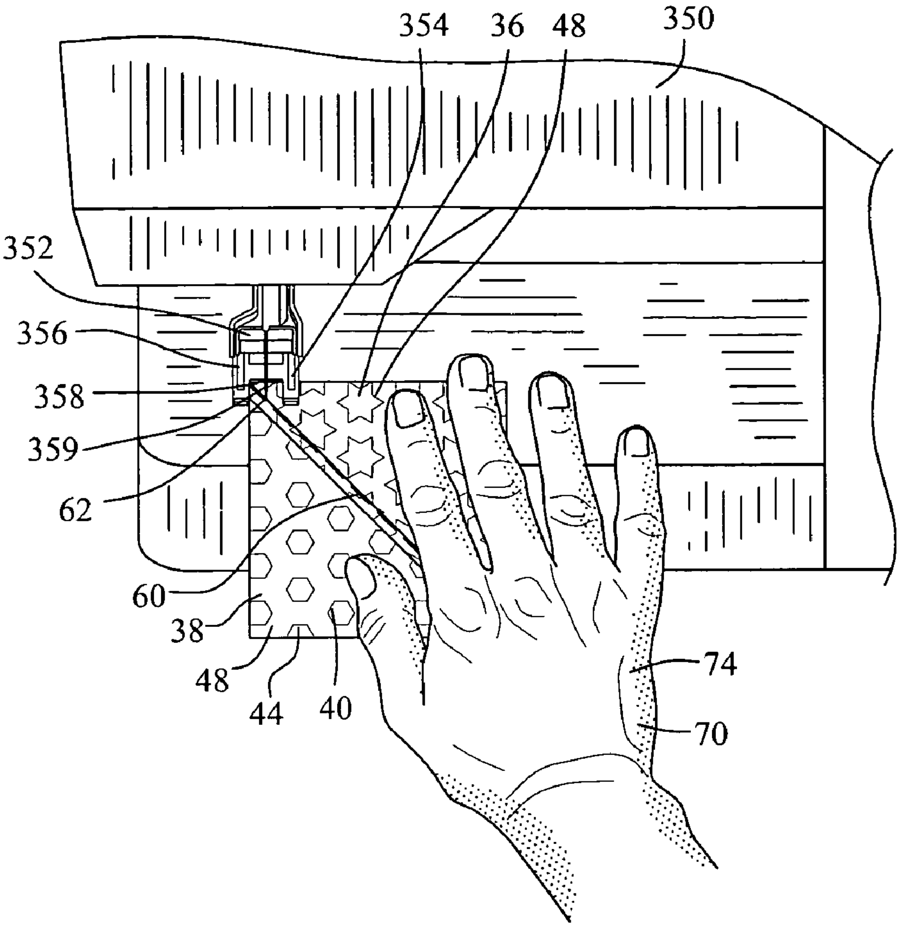
FIG. 36 is a view similar to FIG. 35 illustrating the first quilt piece and the second quilt piece being joined by a first quilt stitching.
Figure 37:
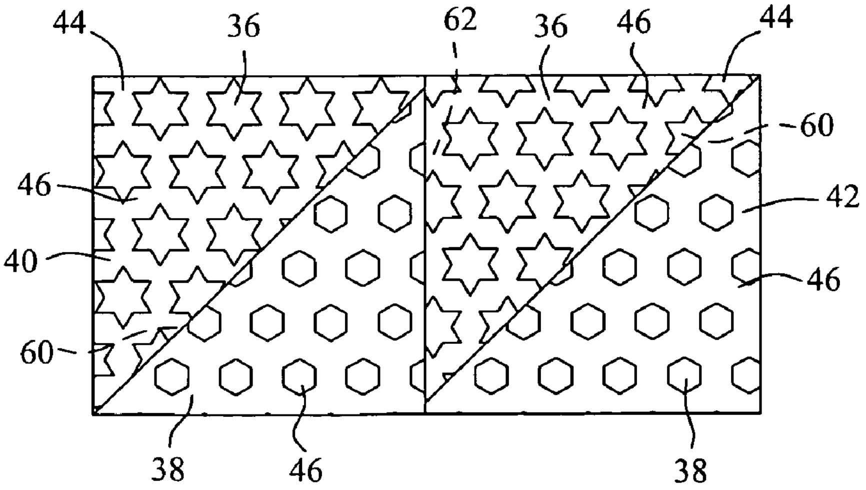
FIG. 37 is a top view of the joined first quilt piece and the second quilt piece.
Figure 38:
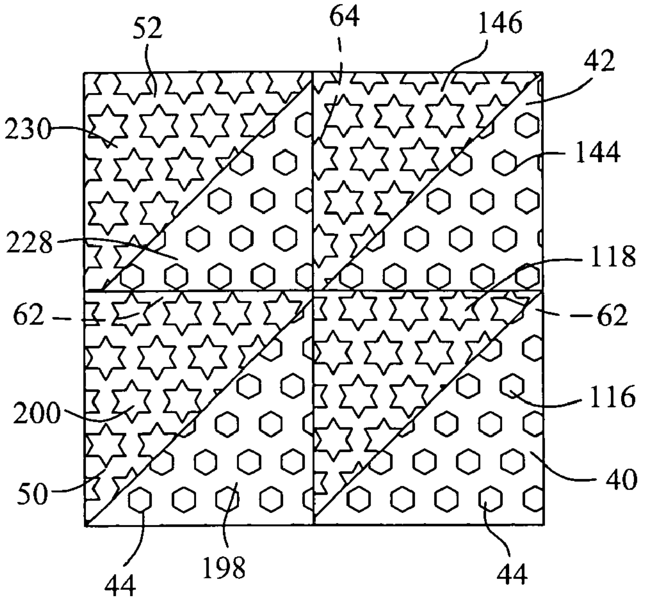
FIG. 38 is a view similar to FIG. 37 illustrating a third quilt piece and a fourth quilt piece joined to the first quilt piece and the second quilt piece.

FIG. 36 illustrates the first half square triangle 40 and the second half square triangle 42 engaging the stitching device 350. The stitching device 350 produces a plurality of couple stitching 62 for securing the first half square triangle 40 the second half square triangle 42. FIG. 38 illustrates the third half square triangle, 50 in the fourth half square triangle 52 being secured to the first half square triangle 40 and the second half square triangle 42 being secured by the plurality of couple stitching 62. As best seen FIG. 39 the steps in FIGS. 31 thru 38 may be repeated to form the quilt 14.

The quilt template 10 as illustrated in FIGS. 9 thru 51 functions to cut the first layer of material 36 and the second layer of material 38 for mass-producing multiple numbers of half square triangles for integrating into the quilt 14. For example, the quilt template 10 as illustrated in FIGS. 9 thru 39 has the ability to mass produce fifty (50) half square triangles. However, if the first layer of material 36 and the second layer of material 38 were large enough to encompass the entire quilt template 10, the maximum number of half square triangles produced by the quilt template 10 would be equal to one hundred and sixty-two (162).

Each of the half square triangles 40, 42, 50, 52, 54, 56, 66 and 68 may further be constructed into a quarter square triangle. The quarter square triangle is created by the stitching device 350 stitching a first quarter stitching and a second quarter stitching that are perpendicular to the plurality of piece stitching 60. The cutting instrument 18 then cuts the quarter square triangle into quarters to produce a quarter square triangle block. The plurality of quarter square triangle block are secured together to construct the quilt 14.

FIGS. 40 thru 51 illustrate the quilt template 10 utilized for constructing a plurality of flying goose pieces 440. The plurality of flying goose pieces 440 are secured together to construct the quilt 14. Similar to FIGS. 9-12 a third layer of material 442 has a decorative side 46 and a rear side 48 positioned over a fourth layer of material 444 also having a decorative side 46 and a rear side 48. The third layer of material 442 is positioned over the fourth layer of material 444 such that the decorative side 46 of both the third of material 442 and the fourth layer of material 444 are adjacent to one another. The adhesive 320 may be utilized between the third layer of material 442 and the fourth layer of material 444 for temporarily retain the third layer of material 442 against the fourth layer of material 444 during utilization of the quilt template 10. The adhesive 320 may include a temporary spray, wherein the third layer of material 442 may be separated from the fourth layer of material 444 by peeling the third layer of material 442 away from the fourth layer of material 444.

Figure 40:
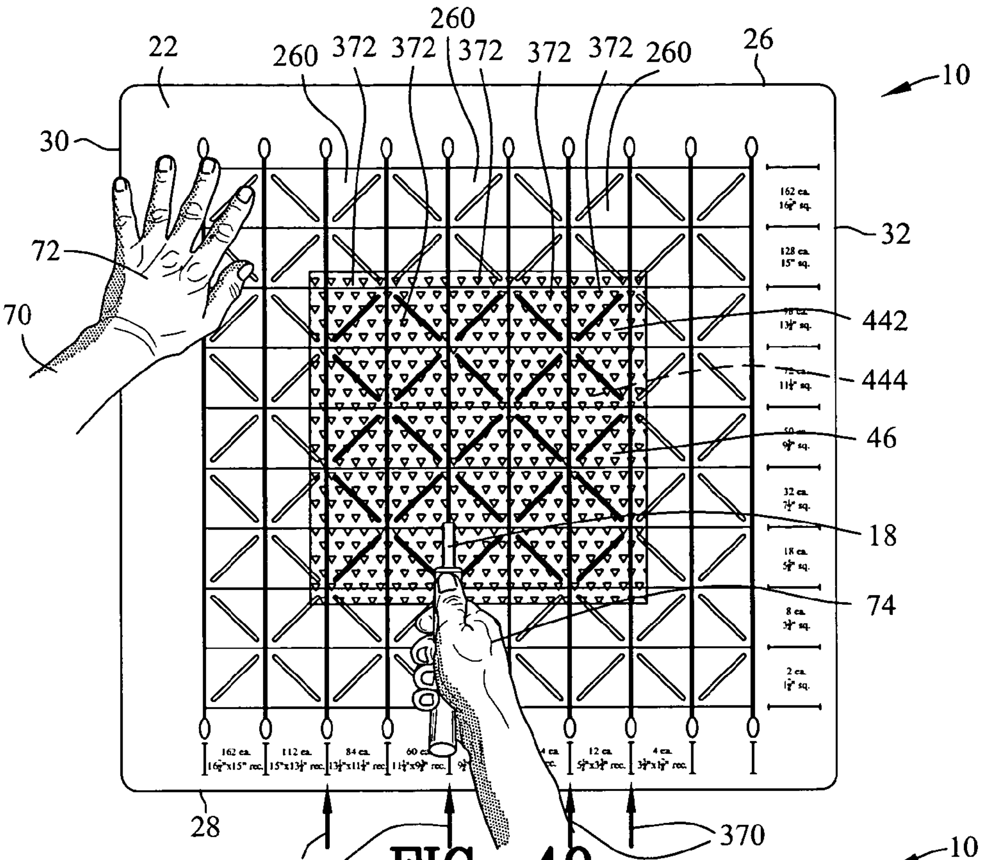
FIG. 40 is a view similar to FIG. 25 illustrating the cutting instrument engaging every other cutting grooves for creating a flying goose quilt design.

FIG. 40 illustrates the quilt template 10 being positioned over the third layer of material 442 and the fourth layer material 444. More specifically the bottom surface 24 of the quilt template 10 is positioned adjacent to the decorative side 46 of the third layer of material 442. The quilt template 10 is centered upon the third layer of material 442 and the fourth layer of material 444 such that the greatest number of plurality of marking columns 260 and the greatest number of plurality of marking rows 262 of the quilt template 10 may be positioned over the third layer of material 442 and the fourth layer of material 444.

Similar to FIGS. 14 and 15, a user 70 then utilizes the writing instrument 16 to engage within the plurality of first marking grooves 330 for applying the first plurality of marks 332 to the rear side 48 of the first layer material 36 and within the second plurality of marking grooves 340 for applying the second plurality of marks 342.

The rotary cutting instrument 18 is inserted within every-other plurality of cutting grooves 90, 100, 170 and propelled between the first end of the grooves 90, 100, and 170 to the second end of the grooves 90, 100, and 170 for creating a first plurality of cuts 370 within the third layer material 442 and the fourth layer material 444. The first plurality of cuts 370 creates a plurality of column pieces 372.

Figure 41:
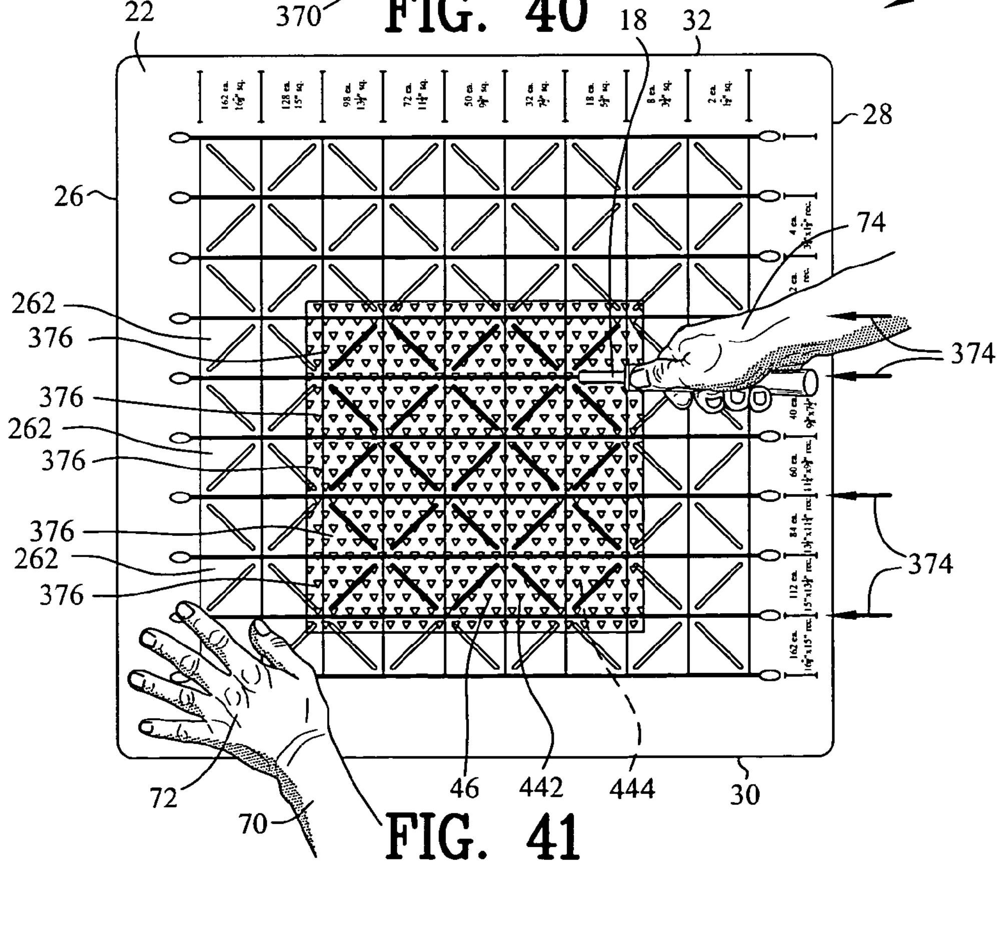
FIG. 41 is a view similar to FIG. 40 illustrating the quilt template being rotated ninety degrees relative to the first layer of material and the second layer of material and the cutting instrument engaging every other cutting grooves.

FIG. 41 illustrates the quilt template 10 rotated 90° relative to the third layer of material 442 and the fourth layer of material 444. It is critical that the quilt template 10 be repositioned on to the third layer material 442 such that the first plurality of marks 332 and the second plurality of marks 342 are aligned within the plurality of first marking grooves 330 and plurality of second marking grooves 340, respectively. Once the quilt template 10 is properly aligned with the third layer material 442, a rotary cutting instrument 18 is again inserted within every-other plurality of cutting grooves 90, 100, 170 and propelled between the first end of the grooves 90, 100, and 170 to the second end of the grooves 90, 100, and 170 for generating a second plurality of cuts 374 within the third layer material 442 and the fourth layer material 444. The second plurality of cuts 374 creates a plurality of square pieces 376.

Figure 42:
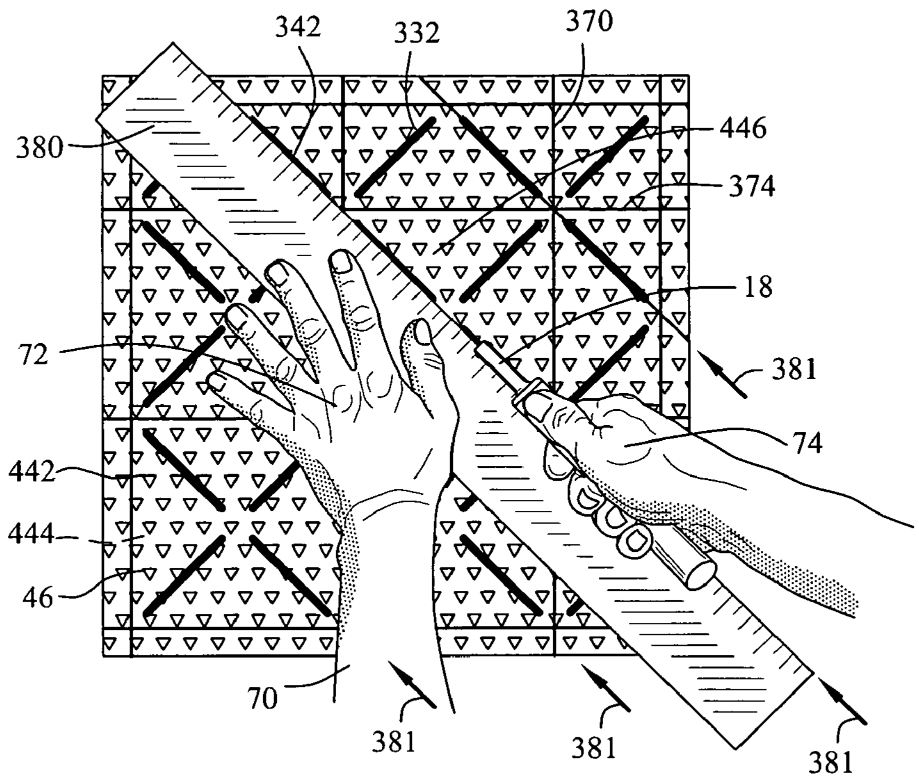
FIG. 42 is a view similar to FIG. 41 after the quilt template is removed from the first layer of material and the second layer of material and illustrating a straight edge aligned with the second plurality of marks and the cutting instrument cutting the first layer of material and the second layer of material along the straight edge.

FIG. 42 illustrates a quilting ruler 380 positioned over the third layer of material 442. The quilting ruler 380 is aligned with the plurality of first plurality of marks 332. Thereafter, the rotary cutting instrument 18 is propelled along the length of the first plurality of marks 332 for generating a third plurality of cuts 381 within the third layer material 442 and the fourth layer material 444. The third plurality of cuts creates a first set of flying triangles 446.

Figure 43:
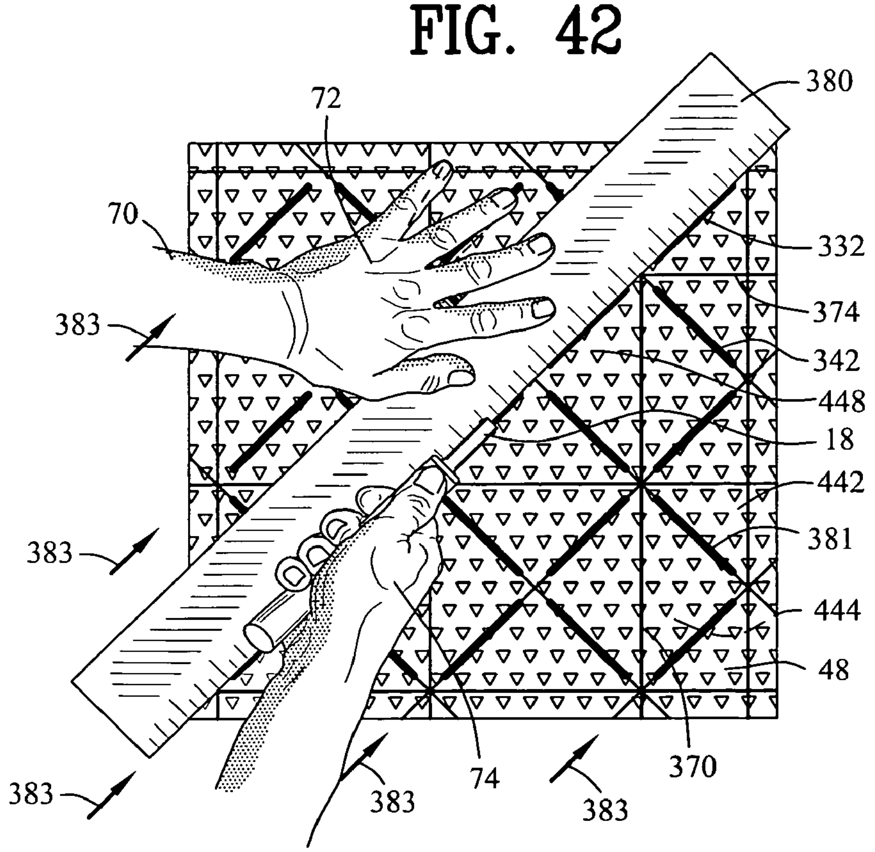
FIG. 43 is a view similar to FIG. 42 illustrating a straight edge aligned with the first plurality of marks and the cutting instrument cutting the first layer of material and the second layer of material along the straight edge.

FIG. 43 illustrates the quilt ruler 380 rotated 90° relative to the third layer of material 442 and the fourth layer of material 444. The quilt ruler 380 is aligned with the second plurality of marks 342. Thereafter, the rotary cutting instrument 18 is propelled along the length of the second plurality of marks 342 for generating a fourth plurality of cuts 383 within the third layer material 442 and the fourth layer material 444. The fourth plurality of cuts 383 create a second set of flying triangle 448.

Figure 44:
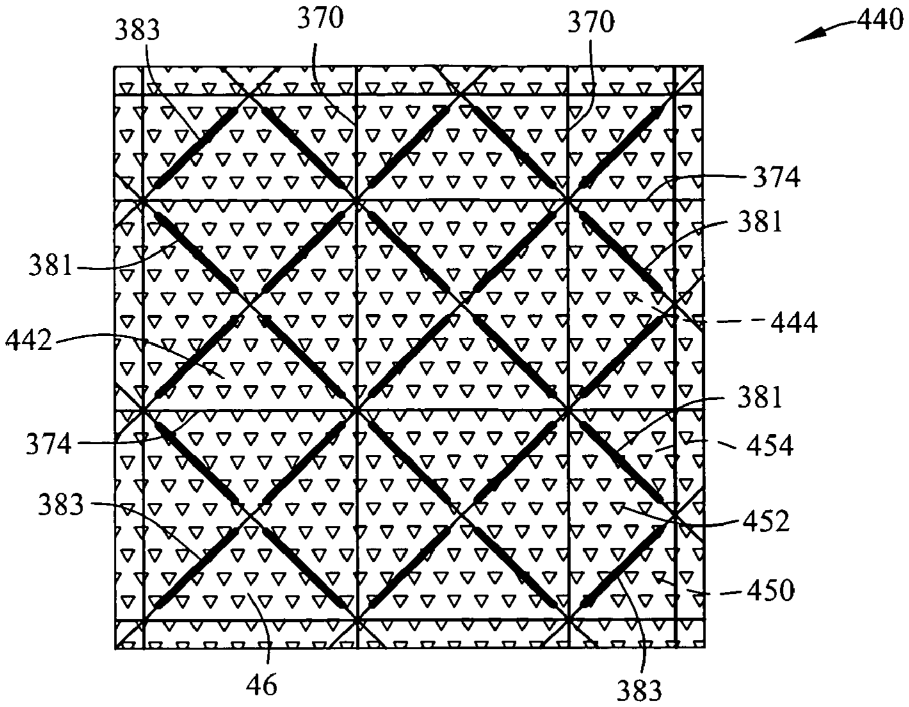
FIG. 44 is a view similar to FIG. 43 after the straight edge is removed from the first layer of material and the second layer of material.

FIG. 44 illustrates the third layer of material 442 and the fourth layer of material 444 wherein the rotary cutting instrument 18 has completed cutting out the flying goose pieces 440. FIG. 45 illustrates the plurality of lying goose pieces 440 being spaced apart.

Figure 46:
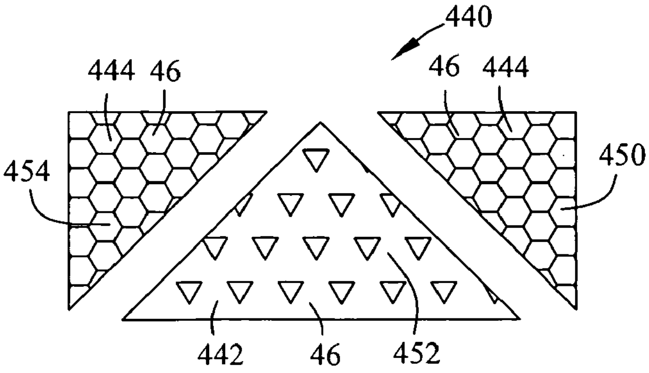
FIG. 46 is a top view of a first flying goose quilt piece, a second flying goose quilt piece and a third flying goose quilt piece.
Figure 47:
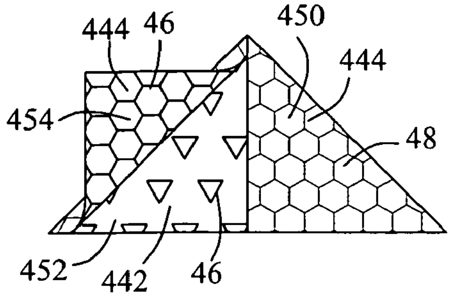
FIG. 47 is a view similar to FIG. 46 illustrating the first flying goose quilt piece and the second flying goose quilt piece being positioned over the third flying goose quilt piece.

FIG. 46 illustrates the a first triangle portion 450 from the fourth layer of material 444, a second triangle portion 452 from the third layer of material 422 and a third triangle portion 454 from the fourth layer of material 444. The first triangle portion 450, the second triangle portion 452 and the third triangle portion 454 are all positioned such that the decorative side 46 is face-up. FIG. 47 illustrates the first triangle portion 450 and the third triangle portion 454 over laying the second triangle portion 452 with the same orientation as shown in FIG. 46. More specifically, the decorative side 46 of both the first triangle portion 450 and the third triangle portion 454 is positioned adjacent to the decorative side of the second triangle portion 452.

Figure 48:
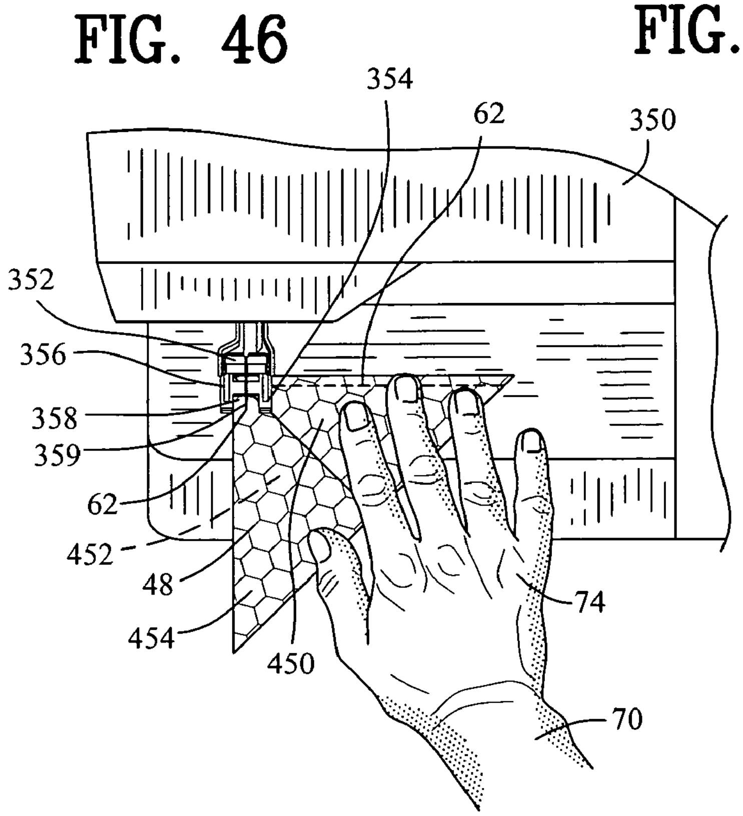
FIG. 48 is a view similar to FIG. 47 illustrating the first flying goose quilt piece and the second flying goose quilt piece being joined to the third flying goose quilt piece by a first quilt stitching.
Figure 49:
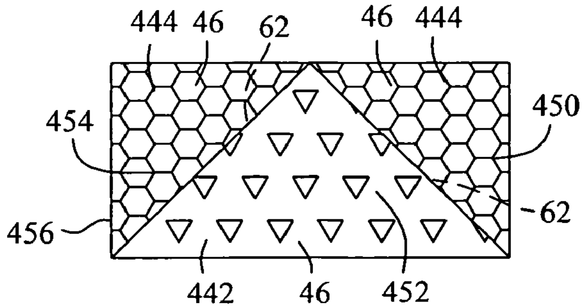
FIG. 49 is a top view of the joined first flying goose quilt piece, the second flying goose quilt piece and the third flying goose quilt piece to form a primary flying goose quilt piece.
Figure 50:
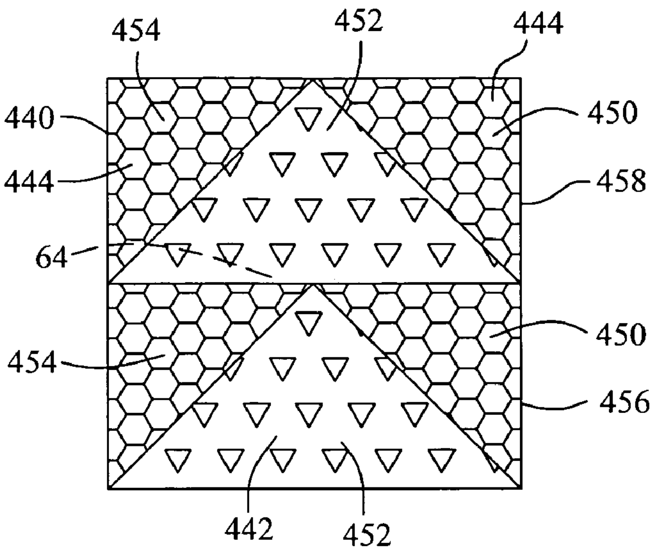
FIG. 50 is a top view of the primary flying goose quilt piece joined with a secondary flying goose quilt piece.

FIG. 48 illustrates the first triangle portion 450, the second triangle portion 452 and the third triangle portion 454 engaging the stitching device 350. The stitching device 350 produces a plurality of couple stitching 62 for securing the first triangle portion 450, the second triangle portion 452 and the third triangle portion 454 together to define as seen in FIG. 49. FIG. 50 illustrates a second flying goose block 446 secured to the flying goose block 440 by the plurality of couple stitching 62. As best seen FIG. 51 the steps in FIGS. 46 thru 50 may be repeated to form the quilt 14.

The quilt template 10 as illustrated in FIGS. 9 thru 51 functions to cut the third layer of material 442 and the fourth layer of material 444 for mass-producing multiple numbers of flying goose block 440 for integrating into the quilt 14.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A quilt template for producing a plurality of quilt pieces, each of the plurality of quilt pieces including a first layer of material and a second layer of material, the quilt template receiving a writing instrument for applying a mark on the first layer of material, the first layer of material and the second layer of material receiving a plurality of piece stitching, the quilt template receiving a cutting instrument for cutting the first layer of material and the second layer of material, the plurality of quilt pieces coupling together by a plurality of quilt stitching for creating a quilt, the quilt template, comprising:

a template plate defining a top surface and a bottom surface for positioning said bottom surface of said template plate over the first layer material and the second layer material;

a marking groove traversing between said top surface to said bottom surface and receiving the writing instrument for providing a reference for the plurality of first stitching and a reference for the cutting instrument;

a first cutting groove traversing between said top surface to said bottom surface and receiving the cutting instrument for cutting the first layer of material and the second layer of material;

a second cutting groove traversing between said top surface to said bottom surface and receiving the cutting instrument for cutting the first layer of material and the second layer of material;

said first cutting groove and said second cutting groove defining a parallel orientation;

said marking groove positioning between said first cutting groove and said second cutting groove;

a first groove stop separating said marking groove from said first cutting groove;

a second groove stop separating said marking groove from said second cutting groove;

said marking groove and said first cutting groove defining a first quilt pattern on said template plate; and said marking groove and said second cutting groove defining a second quilt pattern on said template plate.

2. A quilt template for producing a plurality of quilt pieces as set forth in claim 1, wherein said marking groove includes a non-perpendicular orientation relative to said first cutting groove and said second cutting groove.

3. A quilt template for producing a plurality of quilt pieces as set forth in claim 1, wherein said marking groove includes a forty five degree angle with said first cutting groove and said second cutting groove for defining a first half square triangle and a second half square triangle, respectively.

4. A quilt template for producing a plurality of quilt pieces as set forth in claim 1, wherein a second marking groove traverses between said top surface to said bottom surface and receiving the writing instrument for providing a second reference for the plurality of first stitching and a second reference for the cutting instrument;

said second marking groove positioning between said first cutting groove and said second cutting groove;

said marking groove and said second marking groove including a first mirror image orientation;

a third groove stop separating said second marking groove from said first cutting groove;

a fourth groove stop separating said second marking groove from said second cutting groove;

said second marking groove and said first cutting groove defining a third quilt pattern on said template plate; and said second marking groove and said second cutting groove defining a fourth quilt pattern on said template plate.

5. A quilt template for producing a plurality of quilt pieces as set forth in claim 1, wherein a second marking groove traverses between said top surface to said bottom surface and receiving the writing instrument for providing a second reference for the plurality of piece stitching and a second reference for the cutting instrument;

said second marking groove positioning between said first cutting groove and said second cutting groove;

said marking groove and said second marking groove including a first mirror image orientation;

a third groove stop separating said second marking groove from said first cutting groove;

a fourth groove stop separating said second marking groove from said second cutting groove;

said second marking groove and said first cutting groove defining a third quilt pattern on said template plate;

said second marking groove and said second cutting groove defining a fourth quilt pattern on said template plate;

said marking groove positioned between a first reference line and a second reference line imprinted on said template plate;

said first reference line and said second reference line aligning with the plurality of piece stitching for positioning the template plate relative to the first layer of material;

said second marking groove positioned between a third reference line and a fourth reference line imprinted on said template plate; and said third reference line and said fourth reference line aligning with the plurality of piece stitching for positioning the template plate relative to the first layer of material.

6. A quilt template for producing a plurality of quilt pieces as set forth in claim 1, wherein a second marking groove traverses between said top surface to said bottom surface and receiving the writing instrument for providing a second reference for the plurality of piece stitching and a second reference for the cutting instrument;

said second marking groove positioning between said first cutting groove and said second cutting groove;

a third groove stop separating said second marking groove from said first cutting groove;

a fourth groove stop separating said second marking groove from said second cutting groove;

said second marking groove and said first cutting groove defining a third quilt pattern on said template plate;

said second marking groove and said second cutting groove defining a fourth quilt pattern on said template plate;

said marking groove includes a forty five degree angle relative to said first cutting groove and said second cutting groove for defining a first half square triangle and a second half square triangle, respectively; and said second marking groove includes a forty five degree angle relative to said first cutting groove and said second cutting groove for defining a third half square triangle and a fourth half square triangle, respectively.

7. A quilt template for producing a plurality of quilt pieces as set forth in claim 1, wherein a third cutting groove traversing between said top surface to said bottom surface and receiving the cutting instrument for cutting the first layer of material and the second layer of material;

said second cutting groove and said third cutting groove defining a parallel orientation;

a third marking groove positioning between said second cutting groove and said third cutting groove;

said third marking groove and said marking groove including a second mirror image orientation;

a fifth groove stop separating said third marking groove from said second cutting groove;

a sixth groove stop separating said third marking groove from said third cutting groove;

said third marking groove and said second cutting groove defining a fifth quilt pattern on said template plate; and said third marking groove and said third cutting groove defining a sixth quilt pattern on said template plate.

8. A quilt template for producing a plurality of quilt pieces as set forth in claim 1, wherein a third cutting groove traversing between said top surface to said bottom surface and receiving the cutting instrument for cutting the first layer of material and the second layer of material;

said second cutting groove and said third cutting groove defining a parallel orientation;

a third marking groove positioning between said second cutting groove and said third cutting groove;

said third marking groove and said marking groove including a second mirror image orientation;

a fifth groove stop separating said third marking groove from said second cutting groove;

a sixth groove stop separating said third marking groove from said third cutting groove;

said third marking groove and said second cutting groove defining a fifth quilt pattern on said template plate;

said third marking groove and said third cutting groove defining a sixth quilt pattern on said template plate;

said marking groove positioned between a first reference line and a second reference line imprinted on said template plate;

said first reference line and said second reference line aligning with the plurality of piece stitching for positioning the template plate relative to the first layer of material;

said third marking groove positioned between a fifth reference line and a sixth reference line imprinted on said template plate; and said fifth reference line and said sixth reference line aligning with the plurality of piece stitching for positioning the template plate relative to the first layer of material.

9. A quilt template for producing a plurality of quilt pieces as set forth in claim 1, wherein a third cutting groove traversing between said top surface to said bottom surface and receiving the cutting instrument for cutting the first layer of material and the second layer of material;

said second cutting groove and said third cutting groove defining a parallel orientation;

a third marking groove positioning between said second cutting groove and said third cutting groove;

a fifth groove stop separating said third marking groove from said second cutting groove;

a sixth groove stop separating said third marking groove from said third cutting groove;

said third marking groove and said second cutting groove defining a fifth quilt pattern on said template plate;

said third marking groove and said third cutting groove defining a sixth quilt pattern on said template plate;

said marking groove includes a forty five degree angle relative to said first cutting groove and said second cutting groove for defining a first half square triangle and a second half square triangle, respectively; and said third marking groove includes a forty five degree angle relative to said second cutting groove and said third cutting groove for defining a fifth half square triangle and a sixth half square triangle, respectively.

10. A quilt template for producing a plurality of quilt pieces as set forth in claim 1, wherein said marking groove defines a first linear groove;

said first cutting groove defines a second linear groove; and said second cutting groove defines a third linear groove.

11. A quilt template for producing a plurality of quilt pieces as set forth in claim 1, wherein said first cutting groove and said second cutting groove includes a first taper and a second taper for defining a first channel dimension on said top surface and a second channel dimension on said bottom surface; and said first channel dimension being larger than said second channel dimension for preventing lateral displacement of the cutting instrument within said first cutting groove and said second cutting groove.

12. A quilt template for producing a plurality of quilt pieces as set forth in claim 1, wherein said first cutting groove and said second cutting groove extend between a first end and a second;

a first oval aperture traversing between said top surface to said bottom surface and linked with said first end of said first cutting groove and said second cutting groove for facilitating the insertion or removal of the cutting instrument into said first cutting groove and said second cutting groove; and a second oval aperture traversing between said top surface to said bottom surface and linked with said second end of said first cutting groove and said second cutting groove for facilitating the insertion or removal of the cutting instrument into said first cutting groove and said second cutting groove.

13. A quilt template for producing a plurality of quilt pieces as set forth in claim 1, wherein said first cutting groove and said second cutting groove extend between a first end and a second;

a first tear shape aperture traversing between said top surface to said bottom surface and linked with said first end of said first cutting groove and said second cutting groove for facilitating the insertion or removal of the cutting instrument into said first cutting groove and said second cutting groove; and a second tear shape aperture traversing between said top surface to said bottom surface and linked with said second end of said first cutting groove and said second cutting groove for facilitating the insertion or removal of the cutting instrument into said first cutting groove and said second cutting groove.

14. A quilt template for producing a plurality of quilt pieces as set forth in claim 1, said marking groove positioned between a first reference line and a second reference line imprinted on said template plate; and said first reference line and said second reference line aligning with the plurality of first stitching for positioning the template plate relative to the first layer of material.

15. A quilt template for producing a plurality of quilt pieces as set forth in claim 1, further including a first cross reference line and a second cross reference line imprinted on said template plate for aligning the template plate relative to the first layer of material;

said first cross reference line and a second cross reference line defining a parallel orientation; and said first cross reference line and a second cross reference line defining a perpendicular orientation with said first cutting groove and said second cutting groove.

16. A quilt template for producing a plurality of quilt pieces as set forth in claim 1, further including a vertical table imprinted on said template plate for indicating a vertical numerical size and number of plurality of quilt pieces; and a horizontal table imprinted on said template plate for indicating a horizontal numerical size and number of plurality of quilt pieces.

17. A quilt template for producing a plurality of quilt pieces as set forth in claim 1, wherein said template plate is constructed of a transparent polymeric material.

18. A quilt template for producing a plurality of quilt pieces, each of the plurality of quilt pieces including a first layer of material and a second layer of material, the quilt template receiving a writing instrument for applying a mark on the first layer of material, the first layer of material and the second layer of material receiving a plurality of piece stitching, the quilt template receiving a cutting instrument for cutting the first layer of material and the second layer of material, the plurality of quilt pieces coupling together by a plurality of quilt stitching for creating a quilt, the quilt template, comprising:

a template plate defining a top surface and a bottom surface for positioning said bottom surface of said template plate over the first layer material and the second layer material;

a marking groove traversing between said top surface to said bottom surface and receiving the writing instrument for providing a reference for the plurality of first stitching and a reference for the cutting instrument;

a first cutting groove traversing between said top surface to said bottom surface and receiving the cutting instrument for cutting the first layer of material and the second layer of material;

a second cutting groove traversing between said top surface to said bottom surface and receiving the cutting instrument for cutting the first layer of material and the second layer of material;

said first cutting groove and said second cutting groove defining a parallel orientation;

said marking groove positioning between said first cutting groove and said second cutting groove;

a first groove stop separating said marking groove from said first cutting groove;

a second groove stop separating said marking groove from said second cutting groove;

said marking groove and said first cutting groove defining a first quilt pattern on said template plate;

said marking groove and said second cutting groove defining a second quilt pattern on said template plate;

a second marking groove traverses between said top surface to said bottom surface and receiving the writing instrument for providing a second reference for the plurality of piece stitching and a second reference for the cutting instrument;

said second marking groove positioning between said first cutting groove and said second cutting groove;

said marking groove and said second marking groove including a first mirror image orientation;

a third groove stop separating said second marking groove from said first cutting groove;

a fourth groove stop separating said second marking groove from said second cutting groove;

said second marking groove and said first cutting groove defining a third quilt pattern on said template plate;

said second marking groove and said second cutting groove defining a fourth quilt pattern on said template plate;

said marking groove positioned between a first reference line and a second reference line imprinted on said template plate;

said first reference line and said second reference line aligning with the plurality of piece stitching for positioning the template plate relative to the first layer of material;

said second marking groove positioned between a third reference line and a fourth reference line imprinted on said template plate; and said third reference line and said fourth reference line aligning with the plurality of piece stitching for positioning the template plate relative to the first layer of material.

19. A method for cutting a plurality of quilt pieces from a first layer of material and a second layer of material to construct a quilt, the method, comprising:

adhering the first layer of material to the second layer of material;

positioning a quilt template over the first layer of material and the second layer of material;

marking the first layer of material with a writing instrument inserted into a marking groove;

removing the quilt template from the first layer of material and the second layer of material;

stitching adjacent to the marking for securing the first layer of material and the second layer of material together;

repositioning said quilt template over the first layer of material and the second layer of material such that the marking aligns with said marking groove of said quilt template;

cutting the first layer of material and the second layer of material along a first cutting groove and a second cutting groove;

rotating said quilt template ninety degrees relative to the first layer of material and the second layer of material;

cutting the first layer of material and the second layer of material along said first cutting groove and said second cutting groove;

aligning a straight edge with the marking;

cutting the first layer of material and the second layer of material along said straight edge; and stitching the plurality of quilt pieces together to construct the quilt.

* * * * *